US012715541B2

(12) United States Patent
Tagawa et al.

(10) Patent No.: US 12,715,541 B2
(45) Date of Patent: Aug. 25, 2026

(54) HUMAN-POWERED VEHICLE CONTROL DEVICE, LEARNING MODEL CREATION METHOD, LEARNING MODEL, HUMAN-POWERED VEHICLE CONTROL METHOD AND COMPUTER PROGRAM

(71) Applicant: Shimano Inc., Sakai (JP)

(72) Inventors: Kenji Tagawa, Sakai (JP); Minoru Omori, Sakai (JP)

(73) Assignee: Shimano Inc., Osaka (JP)

( * ) Notice: Subject to any disclaimer, the term of this patent is extended or adjusted under 35 U.S.C. 154(b) by 500 days.

(21) Appl. No.: 18/074,290

(22) Filed: Dec. 2, 2022

(65) Prior Publication Data

US 2023/0182858 A1 Jun. 15, 2023

(30) Foreign Application Priority Data

Dec. 9, 2021 (JP) ................................ 2021-200264

(51) Int. Cl.
*B62M 6/50* (2010.01)
*B62M 9/123* (2010.01)
*B62M 9/133* (2010.01)

(52) U.S. Cl.
CPC .............. *B62M 6/50* (2013.01); *B62M 9/123* (2013.01); *B62M 9/133* (2013.01)

(58) Field of Classification Search
CPC ........ B62M 6/50; B62M 9/123; B62M 9/133; B62M 9/122; B62M 9/132; B62M 6/45; B62J 45/412; B62J 45/41; Y02T 10/72
See application file for complete search history.

(56) References Cited

U.S. PATENT DOCUMENTS 10,967,935 B2 4/2021 Shimazu et al.
2016/0375958 A1* 12/2016 Hashimoto ............ B62M 9/123 701/58
2017/0334514 A1* 11/2017 Chen ........................ B62M 6/55
2020/0010148 A1 1/2020 Shimazu et al.
2020/0012964 A1 1/2020 Shimazu et al.
2020/0102050 A1* 4/2020 Shahana ................ B62M 9/122
2020/0247498 A1* 8/2020 Yamamoto ............. B62J 45/412

* cited by examiner

*Primary Examiner* — Navid Z. Mehdizadeh
(74) *Attorney, Agent, or Firm* — Spencer Fane, LLP

(57) ABSTRACT

A human-powered vehicle control device includes an acquisition unit, a first electronic controller, an operation probability output model and a second electronic controller. The acquisition unit is configured to acquire input information related to traveling of a human-powered vehicle. The first electronic controller is configured to decide control data of a device provided at the human-powered vehicle in accordance with a predetermined control algorithm based on the input information acquired and performs automatic control on the device by the control data decided. The operation probability output model outputs a probability of a rider performing an intervening operation on automatic control of the device based on the input information. The second electronic controller is configured to change a parameter for deciding the control data in a case where a probability that is output from the operation probability output model is equal to or more than a predetermined value.

16 Claims, 33 Drawing Sheets

HUMAN-POWERED VEHICLE CONTROL DEVICE, LEARNING MODEL CREATION METHOD, LEARNING MODEL, HUMAN-POWERED VEHICLE CONTROL METHOD AND COMPUTER PROGRAM

CROSS-REFERENCE TO RELATED APPLICATIONS

This application claims priority to Japanese Patent Application No. 2021-200264, filed on Dec. 9, 2021. The entire disclosure of Japanese Patent Application No. 2021-200264 is hereby incorporated herein by reference.

BACKGROUND

Technical Field

The present disclosure generally relates to a human-powered vehicle control device, a method of creating a learning model, a learning model, a method of controlling a human-powered vehicle, and a computer program.

Background Information

As electrification of human-powered vehicles have recently been increasing, automatic control of a transmission device and an assist device has been achieved. An automatic gear shifting control system has been proposed for automatically deciding a gear ratio by performing computations on outputs from sensors such as a speed sensor, a cadence sensor, a chain tension sensor and the like that are provided at a human-powered vehicle. For the automatic gear shifting control system, a method has also been proposed of performing deep learning using training data including outputs from the sensors labeled with the results of gear sifting by the rider's operation and performing control based on the data obtained from the trained model (e.g., see U.S. Pat. No. 10,967,935—Patent Document 1, etc.).

SUMMARY

An automatic control using a trained model is preferably optimized based on the physical characteristics, interests and taste of the rider or a traveling environment especially in the case of the human-powered vehicle at least partially driven by a human force. The trained model may be obtained by using deep learning or an algorithm such as regression analysis or the like.

It is an object of the present disclosure to provide a human-powered vehicle control device that optimizes a reference of control by automatic control for each individual rider, a learning model creation method, a human-powered vehicle control method and a computer program.

A human-powered vehicle control device according to a first aspect of the present disclosure comprises at least one sensor, a first electronic controller, a non-transitory computer readable storage and a second electronic controller. The at least one sensor is configured to acquire input information related to traveling of a human-powered vehicle. The first electronic controller is configured to decide control data of a device provided at the human-powered vehicle in accordance with a predetermined control algorithm based on the input information acquired and performs automatic control on the device by the control data decided. The a non-transitory computer readable storage has an operation probability output model that outputs a probability of a rider performing an intervening operation on automatic control of the device based on the input information. The second electronic controller is configured to change a parameter for deciding the control data in a case where a probability that is output from the operation probability output model is equal to or more than a predetermined value.

According to the human-powered vehicle control device according to the above-mentioned first aspect, data indicating a probability of a rider performing a manual operation on the automatic control according to a predetermined control algorithm by the first electronic controller, i.e., a possibility of the rider intervening the automatic control can be obtained. In the case where the probability is equal to or more than the predetermined value, the parameter used in the control algorithm to which the first electronic controller refers is changed so as to be optimized for each rider.

In accordance with a second aspect of the present disclosure, the human-powered vehicle control device according to the above-mentioned first aspect is configured so that the second electronic controller is configured to train the operation probability output model, set the input information as an input, and set, as an output label, a presence or an absence of an intervening operation performed on the device by the rider a predetermined time after the input information is acquired.

According to the human-powered vehicle control device of the above-mentioned second aspect, the operation probability output model can be trained while the habit, the preference and the like of the rider are being reflected on the model based on the type of an operation actually performed by the rider.

In accordance with a third aspect of the present disclosure, the human-powered vehicle control device according to the above-mentioned first aspect is configured so that the second electronic controller is configured to train the operation probability output model, set the input information as an input, and set, as an output label, a value corresponding to the rider's discomfort level a predetermined time after the input information is acquired.

According to the human-powered vehicle control device of the above-mentioned third aspect, learning can be performed taking the case where the rider feels uncomfortable with the automatic control into account though he or she does not perform an actual operation on the automatic control.

For the human-powered vehicle control device according to a fourth aspect of the present disclosure, the human-powered vehicle control device according to the above-mentioned third aspect is configured such that the rider's discomfort level is derived based on at least one of a magnitude of a cadence of the human-powered vehicle, a magnitude of a torque of the human-powered vehicle, a seated state of the rider, and biological information of the rider.

According to the human-powered vehicle control device of the above-mentioned fourth aspect, discomfort level can be quantified based on the cadence, the torque, whether or not the rider is pedaling the human-powered vehicle while standing or the biological information of the rider as well as an intervening operation performed on the automatic control.

For the human-powered vehicle control device according to a fifth aspect of the present disclosure, the human-powered vehicle control device according to any one of the above-mentioned second to fourth aspects, processing by the second electronic controller is configured to execute processing in a case where an error between a probability obtained by inputting the input information to the operation probability output model and a result as to whether or not the rider has performed the intervening operation after a predetermined time falls in a predetermined matching ratio.

According to the human-powered vehicle control device of the above-mentioned fifth aspect, the operation probability output model is used only after learning has progressed to the point where the output from the operation probability output model matches the operation performed by the rider.

For the human-powered vehicle control device according to a sixth aspect of the present disclosure, the human-powered vehicle control device according to any one of the above-mentioned first to fifth aspects is configured such that the first electronic controller is configured to use the predetermined control algorithm to decide the control data of the device based on the input information using a different parameter depending on a traveling condition of the human-powered vehicle, and the second electronic controller is configured to train the operation probability output model depending on the traveling condition.

The reference as to whether or not the rider performs an intervening operation on the automatic control can vary depending on an upward slope, a downward slope, a paved road, off-road and the like. According to the human-powered vehicle control device of the above-mentioned sixth aspect, the references varying depending on the traveling conditions can be individually optimized to suit the rider's intention.

A human-powered vehicle control device according to a seventh aspect of the present disclosure comprises at least one sensor, a first electronic controller, a non-transitory computer readable storage and a second electronic controller. The at least one sensor is configured to acquire input information related to traveling of a human-powered vehicle; a first electronic controller is configured to decide control data of a device provided at the human-powered vehicle in accordance with a predetermined control algorithm based on the input information acquired and performs automatic control on the device by the control data decided. The non-transitory computer readable storage has an operation content prediction model that predicts an operation content to be performed on the device by a rider based on the input information. The second electronic controller is configured to change a parameter for deciding the control data in a case where a deviation rate between the operation content predicted by the operation content prediction model and the control data decided by the first electronic controller is equal to or more than a predetermined value.

According to the human-powered vehicle control device of the above-mentioned seventh aspect, the operation content prediction model can be trained while the habit, the preference and the like of the rider are being reflected on the model based on the type of an operation actually performed by the rider. Automatic control can be optimized so as not to be deviated from the operation content predicted by the operation content prediction model that has been trained to suit the rider.

In accordance with an eighth aspect of the present disclosure, the human-powered vehicle control device according to the above-mentioned seventh aspect is configured such that the second electronic controller is configured to train the operation content prediction model, set the input information as an input, and set, as an output label, an operation content performed on the device by the rider a predetermined time after the input information is acquired.

According to the human-powered vehicle control device of the above-mentioned eighth aspect, the operation content prediction model can be trained while the habit, the preference and the like of the rider are being reflected on the model based on the type of an operation actually performed by the rider.

For the human-powered vehicle control device according to a ninth aspect of the present disclosure, the human-powered vehicle control device according to the above-mentioned eighth aspect is configured such that the second electronic controller is configured to execute processing in a case where an error between an operation content obtained by inputting the input information to the operation content prediction model and the operation content performed by the rider after the predetermined time falls within a predetermined matching ratio.

According to the human-powered vehicle control device of the ninth aspect, the operation content prediction model is used only after learning has progressed to the point where the output from the operation probability output model matches the operation performed by the rider.

For the human-powered vehicle control device according to a tenth aspect of the present disclosure, the human-powered vehicle control device according any one of the above-mentioned seventh to ninth aspects is configured such that the first electronic controller is configured to use the predetermined control algorithm to decide the control data of the device based on the input information using a different parameter depending on a traveling condition of the human-powered vehicle, and the second electronic controller is configured to train the operation content prediction model depending on the traveling condition.

According to the human-powered vehicle control device of the above-mentioned tenth aspect, the references varying depending on the traveling conditions can be optimized for each individual rider.

For the human-powered vehicle control device according to an eleventh aspect of the present disclosure, the human-powered vehicle control device according to any one of the seventh to tenth aspects is configured such that the second electronic controller is configured to change a parameter such that control data corresponding to the operation content predicted by the operation content prediction model is easily decided by the first electronic controller in a case where the deviation rate is equal to or more than a predetermined value.

According to the human-powered vehicle control device of the above-mentioned eleventh aspect, the parameter for the automatic control is changed in line with the operation content predicted by the operation content prediction model that has been trained so as to suit the rider.

For the human-powered vehicle control device according to a twelfth aspect of the present disclosure, the human-powered vehicle control device according any one of the above-mentioned first to eleventh aspects is configured such that the predetermined control algorithm includes a procedure of comparing a sensor value included in the input information with a predetermined threshold and deciding the control data, and the second electronic controller is configured to execute at least one of changing a value of the threshold and changing a control timing performed by the first electronic controller.

According to the human-powered vehicle control device of the above-mentioned twelfth aspect, the parameter for the automatic control to be changed can be timing as well as a threshold to be compared with input information, which optimizes the automatic control.

For the human-powered vehicle control device according to a thirteenth aspect of the present disclosure, the human-powered vehicle control device according to any one of the above-mentioned first to eleventh aspects is configured such that the predetermined control algorithm is a learning model trained so as to output control data of the device based on the input information, and the second electronic controller is configured to change a parameter of the learning model.

According to the human-powered vehicle control device of the above-mentioned thirteenth aspect, the control algorithm used for the automatic control can also be a learning model that has been trained so as to output control data in the case where input information is input, which can optimize the automatic control.

For the human-powered vehicle control device according to a fourteenth aspect of the present disclosure, the human-powered vehicle control device according to any one of the above-mentioned first to twelfth aspects is configured such that the device is a transmission device of the human-powered vehicle, and the input information includes a cadence of a crank in a driving mechanism of the human-powered vehicle. The first electronic controller is configured to control the transmission device so as to increase a gear ratio in a case where an acquired cadence is equal to or more than a predetermined first threshold, and control the transmission device so as to decrease the gear ratio in a case where the acquired cadence is equal to or lower than a second threshold that is below the first threshold, and the second electronic controller is configured to change at least one of the first threshold and the second threshold.

According to the human-powered vehicle control device of the above-mentioned fourteenth aspect, in the case where the transmission device is automatically controlled by comparing the cadence obtained during traveling and the predetermined first and second thresholds, the first and second thresholds are changed to suit the rider's operation and preference and optimized for the rider.

For the human-powered vehicle control device according to a fifteenth aspect of the present disclosure, the human-powered vehicle control device according to the above-mentioned fourteenth aspect is configured such that the second electronic controller is configured to execute at least one of lowering the first threshold and raising the second threshold.

According to the human-powered vehicle control device of the above-mentioned fifteenth aspect, the automatic control can be adapted to the rider's intention if the rider feels the need of changing the gear ratio though in the automatic control, the gear ratio is not changed unless the cadence reaches the first threshold or the second threshold.

For the human-powered vehicle control device according to a sixteenth aspect of the present disclosure, the human-powered vehicle control device according to any one of the above-mentioned first to twelfth aspects is configured such that the device is a transmission device of the human-powered vehicle, and the input information includes a torque of a crank in a driving mechanism of the human-powered vehicle. The first electronic controller is configured to control the transmission device so as to decrease the gear ratio in a case where an acquired torque is equal to or more than a predetermined third threshold, and control the transmission device so as to increase the gear ratio in a case where the acquired torque is equal to or less than a fourth threshold that is below the third threshold, and the second electronic controller is configured to change at least one of the third threshold and the fourth threshold.

According to the human-powered vehicle control device of the above-mentioned sixteenth aspect, in the case where the transmission device is automatically controlled by comparing the torque acquired during traveling and the predetermined third and fourth thresholds, the third and fourth thresholds are changed so as to suit the rider's operation and preference and optimized for the rider.

For the human-powered vehicle control device according to a seventeenth aspect of the present disclosure, the human-powered vehicle control device according to the above-mentioned sixteenth aspect is configured such that the second electronic controller is configured to execute at least one of lowering the third threshold and raising the fourth threshold.

According to the human-powered vehicle control device of the above-mentioned seventeenth aspect, the automatic control can be adapted to the rider's intention by lowering the third threshold if the rider feels the need of changing the gear ratio though in the automatic control, the gear ratio is not changed unless the torque reaches the third threshold. Likewise, the automatic control can be adapted to the rider's intention by raising the fourth threshold though the gear ratio is not changed unless the torque reaches the fourth threshold.

For the human-powered vehicle control device according to an eighteenth aspect of the present disclosure, the human-powered vehicle control device according to any one of the above-mentioned first to twelfth aspects is configured such that the device is a transmission device of the human-powered vehicle, and the input information includes a travel speed of the human-powered vehicle. The first electronic controller is configured to control the transmission device so as to increase a gear ratio in a case where an acquired travel speed is equal to or more than a predetermined fifth threshold, and control the transmission device so as to decrease the gear ratio in a case where the acquired travel speed is equal to or lower than a sixth threshold that is below the fifth threshold, and the second electronic controller is configured to change at least one of the fifth threshold and the sixth threshold.

According to the human-powered vehicle control device of the above-mentioned eighteenth aspect, in the case where the transmission device is automatically controlled by comparing the travel speed and the predetermined fifth and sixth thresholds, the fifth and sixth thresholds are changed to suit the rider's operation and preference and optimized for the rider.

For the human-powered vehicle control device of a nineteenth aspect of the present disclosure, the human-powered vehicle control device according to the above-mentioned eighteenth aspect is configured such that the second electronic controller is configured to execute at least one of lowering the fifth threshold and raising the sixth threshold.

According to the human-powered vehicle control device of the above-mentioned nineteenth aspect, the automatic control can be adapted to the rider's intention by lowering the fifth threshold if the rider feels the need of changing the gear ratio though in the automatic control, the gear ratio is not changed unless the travel speed reaches the fifth threshold. Likewise, the automatic control can be adapted to the rider's intention by raising the sixth threshold though the gear ratio is not changed unless the travel speed reaches the sixth threshold.

For the human-powered vehicle control device of a twentieth aspect of the present disclosure, the human-powered vehicle control device according to any one of the above-mentioned first to twelfth aspects is configured such that the device is an assist device of the human-powered vehicle, and the input information includes a cadence of a crank in a driving mechanism of the human-powered vehicle. The first electronic controller is configured to control the assist device so as to decrease an output in a case where an acquired cadence is equal to or more than a predetermined seventh threshold and controls the assist device so as to increase the output in a case where the acquired cadence is equal to or lower than an eighth threshold that is below the seventh threshold, and the second electronic controller is configured to change at least one of the seventh threshold and the eighth threshold.

According to the human-powered vehicle control device of the above-mentioned twentieth aspect, in the case where the output from the assist device is automatically controlled by comparing the cadence and the predetermined seventh and eights thresholds, the seventh and eights thresholds are changed to suit the rider's preference and operation and optimized for the rider.

For the human-powered vehicle control device according to a twenty-first aspect of the present disclosure, the human-powered vehicle control device according to the above-mentioned twentieth aspect is configured such that the second electronic controller is configured to execute at least one of lowering the seventh threshold and raising the eighth threshold.

According to the human-powered vehicle control device of the above-mentioned twenty-first aspect, the automatic control can be adapted to the rider's intention by lowering the seventh threshold if the rider feels the need of changing the gear ratio though in the automatic control, the output from the assist device is not changed unless the cadence reaches the seventh threshold. Likewise, the automatic control can be adapted to the rider's intention by raising the eighth threshold though the gear ratio is not changed unless the cadence reaches the eighth threshold.

For the human-powered vehicle control device according to a twenty-second aspect of the present disclosure, the human-powered vehicle control device according to any one of the above-mentioned first to twelfth aspects is configured such that the device is an assist device of the human-powered vehicle, and the input information includes a torque of a crank in a driving mechanism of the human-powered vehicle. The first electronic controller is configured to control the assist device so as to increase an output of the assist device in a case where an acquired torque is equal to or more than a predetermined ninth threshold, and control the assist device so as to decrease the output of the assist device in a case where the acquired torque is equal to or less than a tenth threshold that is below the ninth threshold, and the second electronic controller is configured to change at least one of the ninth threshold and the tenth threshold.

According to the human-powered vehicle control device of the above-mentioned twenty-second aspect, in the case where the output from the assist device is automatically controlled by comparing the torque and the predetermined ninth and tenth thresholds, the ninth and tenth thresholds are changed so as to suit the rider's operation and preference and optimized for the rider.

For the human-powered vehicle control device according to a twenty-third aspect of the present disclosure, in the human-powered vehicle control device according to the above-mentioned twenty-second aspect is configured such that the second electronic controller is configured to execute at least one of lowering the ninth threshold and raising the tenth threshold.

According to the human-powered vehicle control device of the above-mentioned twenty-third aspect, the automatic control can be adapted to the rider's intention by lowering the ninth threshold if the rider feels the need of changing the gear ratio though in the automatic control, the output from the assist device is not changed unless the torque reaches the ninth threshold. Likewise, the automatic control can be adapted to the rider's intention by raising the tenth threshold though the gear ratio is not changed unless the cadence reaches the tenth threshold.

A learning model creation method according to a twenty-fourth aspect of the present disclosure comprises training, during traveling of a human-powered vehicle, a learning model that outputs a probability of a rider performing an intervening operation on a device provided at the human-powered vehicle based on input information related to traveling of the human-powered vehicle using training data including the input information as an input and a presence or an absence of an intervening operation performed on the device by the rider a predetermined time after the input information is acquired as an output label.

According to the learning model creation method of the above-mentioned twenty-fourth aspect, the operation probability output model can be trained so as to suit the traits such as the habit, the preference or the like of the actual rider.

A learning model creation method according to a twenty-fifth aspect of the present disclosure comprises training, during traveling of a human-powered vehicle, a learning model that outputs data indicating an operation content predicted to be performed on a device provided at the human-powered vehicle by a rider based on input information related to traveling of the human-powered vehicle by using training data including the input information as an input and an operation content performed on the device by the rider a predetermined time after the input information is acquired as an output label.

According to the learning model creation method of the above-mentioned twenty-fifth aspect, the operation content prediction model can be trained so as to suit the traits such as the habit, the preference or the like of the actual rider.

A non-transitory computer learning model disposed upon a non-transitory computer readable storage medium and executable by a computer, the non-transitory computer learning model according to a twenty-sixth aspect of the present disclosure comprises an input layer, an output layer and an intermediate layer. Input information related to traveling of a human-powered vehicle is inputted to the input layer. A probability of a rider performing an intervening operation on a device provided at the human-powered vehicle is outputted from the output layer. The intermediate layer is trained by training data including the input information as an input and a presence or an absence of an intervening operation performed on the device by the rider a predetermined time after the input information is acquired as an output label. The learning model is configured to be used for processing of providing the input layer with the input information, performing a calculation based on the intermediate layer, and outputting from the output layer a probability of the rider performing an intervening operation on the device corresponding to the input information, while the human-powered vehicle is traveling.

According to the non-transitory computer learning model of the above-mentioned twenty-sixth aspect, the operation probability output model can be trained so as to suit the traits such as the habit, the preference or the like of the actual rider. By using the operation probability output model trained so as to suit the rider, the reference for the automatic control of the human-powered vehicle can be optimized for the rider.

A non-transitory computer learning model disposed upon a non-transitory computer readable storage medium and executable by a computer, the non-transitory computer learning model according to the above-mentioned twenty-seventh aspect of the present disclosure comprises: an input layer, an output layer and an intermediate layer. Input information related to traveling of a human-powered vehicle is inputted to the input layer. Data indicating an operation content predicted to be performed on a device provided at the human-powered vehicle by a rider is outputted from the output layer. The intermediate layer is trained by training data including the input information as an input and an operation content performed on the device by the rider a predetermined time after the input information is acquired as an output label. The learning model is configured to be used for processing of providing the input layer with the input information, performing a calculation based on the intermediate layer, and outputting from the output layer data indicating an operation content performed on the device by the rider corresponding to the input information, while the human-powered vehicle is traveling.

According to the non-transitory computer learning model of the above-mentioned twenty-seventh aspect, the operation content prediction model can be trained so as to suit the traits such as the habit, the preference or the like of the actual rider. By using the operation content prediction model trained so as to suit the rider, the reference for the automatic control of the human-powered vehicle can be optimized for the rider.

A human-powered vehicle control method according to a twenty-eighth aspect of the present disclosure comprises: acquiring input information related to traveling of a human-powered vehicle, using an operation probability output model that outputs based on the input information acquired a probability of a rider performing an intervening operation on an electronic controller that performs automatic control on a device provided at the human-powered vehicle in accordance with a predetermined control algorithm based on the input information, changing a parameter for the automatic control in a case where the probability output from the operation probability output model is equal to or more than a predetermined value, and performing automatic control with a changed parameter by the electronic controller.

According to the human-powered vehicle control method of the above-mentioned twenty-eighth aspect, the automatic control according to the predetermined control algorithm can individually be optimized based on a track record of the presence or absence of an operation performed by the rider.

A human-powered vehicle control method according to a twenty-ninth aspect of the present disclosure comprises: acquiring input information related to traveling of a human-powered vehicle; using an operation content prediction model that predicts an operation content to be performed on a device provided at the human-powered vehicle by a rider for an electronic controller that decides control data of the device in accordance with a predetermined control algorithm based on the input information acquired and performs automatic control; changing a parameter for the automatic control in a case where a deviation rate between the operation content predicted by the operation content prediction model and the control data decided by the electronic controller is equal to or more than a predetermined value; and performing automatic control with a changed parameter by the electronic controller.

According to the human-powered vehicle control method of the above-mentioned twenty-ninth aspect, the automatic control according to the predetermined control algorithm can individually be optimized based on a track record of the operation content performed by the rider.

A computer program according to a thirtieth aspect of the present disclosure is disposed upon a non-transitory computer readable storage medium and is executable by a computer. The computer program causes the computer to execute processing of acquiring input information related to traveling of a human-powered vehicle; using an operation probability output model that outputs based on the input information acquired a probability of a rider performing an intervening operation on an electronic controller that performs automatic control on a device provided at the human-powered vehicle in accordance with a predetermined control algorithm based on the input information, and changing a parameter for the automatic control in a case where a probability output from the operation probability output model is equal to or more than a predetermined value.

According to the computer program of the above-mentioned thirtieth aspect, the automatic control according to the predetermined control algorithm can individually be optimized based on a track record of an operation by the rider.

A computer program according to a thirty-first aspect of the present disclosure is disposed upon a non-transitory computer readable storage medium and is executable by a computer. The computer program causes the computer to execute processing of acquiring input information related to traveling of a human-powered vehicle; using an operation content prediction model that predicts an operation content to be performed on a device provided at the human-powered vehicle by a rider for an electronic controller that decides control data of the device in accordance with a predetermined control algorithm based on the input information acquired and performs automatic control; and changing a parameter for the automatic control in a case where a deviation rate between the operation content predicted by the operation content prediction model and the control data decided by the electronic controller is equal to or more than a predetermined value.

According to the computer program of the above-mentioned thirty-first aspect, the automatic control according to the predetermined control algorithm can individually be optimized based on a track record of an operation content by the rider.

According to the present disclosure, automatic control for the human-powered vehicle can be optimized for each individual rider.

BRIEF DESCRIPTION OF THE DRAWINGS

Referring now to the attached drawings which form a part of this original disclosure.

DETAILED DESCRIPTION OF EMBODIMENTS

The descriptions of the embodiments below are examples of forms that a human-powered vehicle control device according to the present invention can take, and there is no intention to limit the forms. In accordance with the present invention can take forms different from the embodiments, such as forms of modification of the embodiments and a combination of at least two modifications that do not contradict each other.

In the following description of each of the embodiments, the terms indicating directions, such as front, back, forward, backward, left, right, sideways, upper, lower and so on are used with reference to the directions seen as the user sits in the saddle of a human-powered vehicle.

First Embodiment

Figure 1:
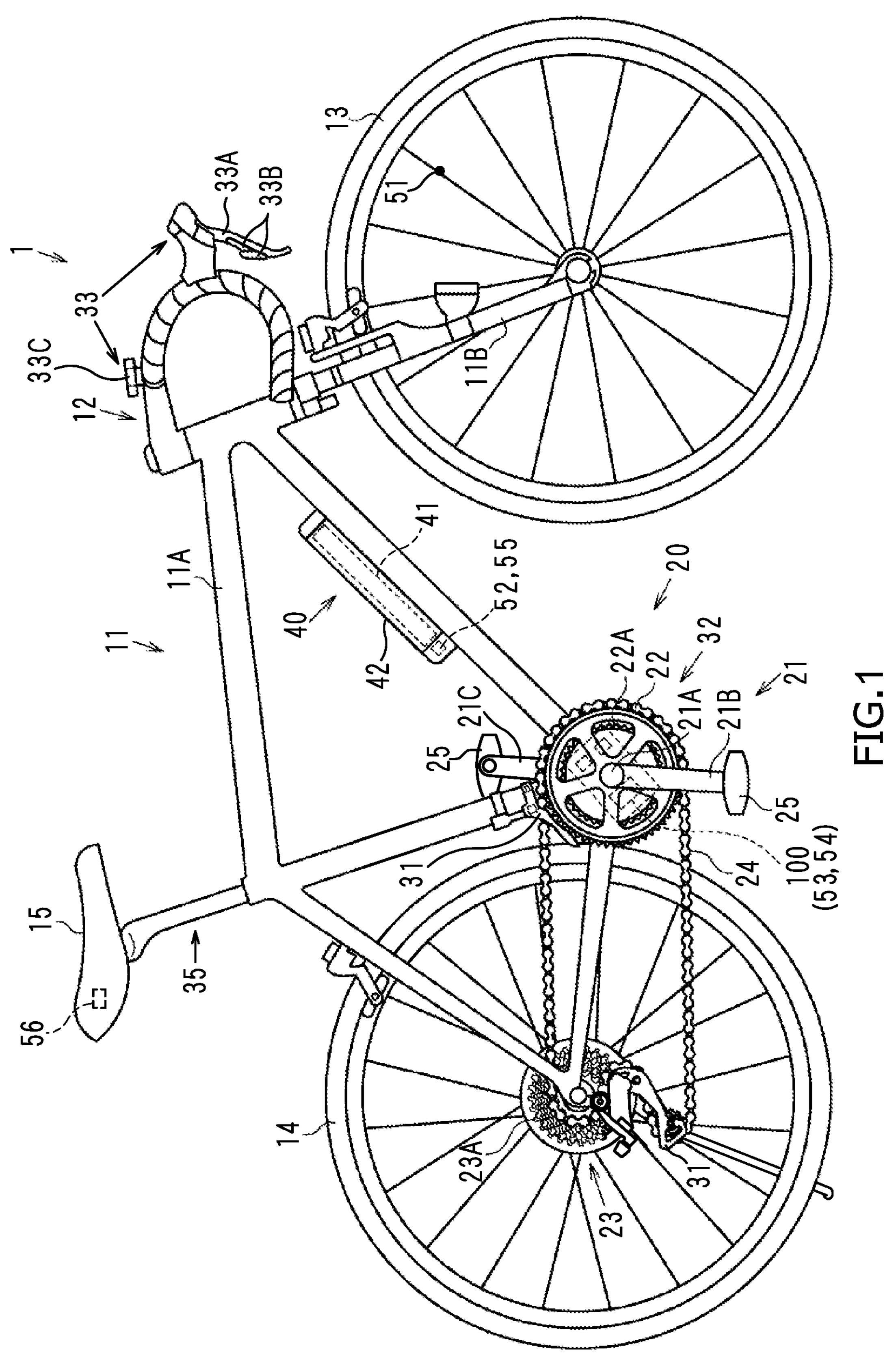
FIG. 1 is a side elevational view of a human-powered vehicle to which a control device is applied according to a first embodiment.

FIG. 1 is a side elevational view of a human-powered vehicle 1 to which a control device 100 is applied according to a first embodiment. The human-powered vehicle 1 is a vehicle that at least partially uses man power as a driving force for traveling. Vehicles using only an internal combustion engine or an electric motor as a driving force are excluded from the human-powered vehicle 1 according to the present embodiment. The human-powered vehicle 1 is a bicycle including, for example, a mountain bicycle, a road bicycle, a cross bicycle, a city cycle and an electric assisted bicycle (e-bike).

The human-powered vehicle 1 is provided with a vehicle main body 11, a handlebar 12, a front wheel 13, a rear wheel 14 and a saddle 15. The human-powered vehicle 1 is provided with a driving mechanism 20, a device 30 (31-32), an operation device 33 (33A, 33*b*, 33C), a battery 40 and a sensor 50 (51-56).

An electronic controller 110 of the control device 100 controls the device 30 including a transmission device 31 and an assist device 32 that are provided at the human-powered vehicle 1. The control device 100 is provided at the battery 40, a cycle computer or a drive unit of the human-powered vehicle 1 as one example.

The control device 100 is connected to the device 30, the operation device 33 and the battery 40. The connected manner and the details of the control device 100 will be described later.

The vehicle main body 11 is provided with a frame 11A and a front fork 11B. The front wheel 13 is rotatably supported to the front fork 11B. The rear wheel 14 is rotatably supported to the frame 11A. The handlebar 12 is supported to the frame 11A so as to be able to change the direction of progress of the front wheel 13.

The driving mechanism 20 transmits a human-powered drive force to the rear wheel 14. The driving mechanism 20 includes a crank 21, a first sprocket assembly 22, a second sprocket assembly 23, a chain 24 and a pair of pedals 25.

The crank 21 includes a crank shaft 21A, a right crank 21B and a left crank 21C. The crank shaft 21A is rotatably supported to the frame 11A. The right crank 21B and the left crank 21C are coupled to the crank shaft 21A. One of the pair of pedals 25 is rotatably supported to the right crank 21B. The other one of the pair of pedals 25 is rotatably supported to the left crank 21C.

The first sprocket assembly 22 is coupled to the crank shaft 21A so as to be rotatable as one piece. The first sprocket assembly 22 includes one or more sprockets 22A. The first sprocket assembly 22 includes the multiple sprockets 22A different in outer diameters as one example.

The second sprocket assembly 23 is rotatably coupled to a rear hub of the rear wheel 14. The second sprocket assembly 23 includes one or more sprockets 23A. The second sprocket assembly 23 includes the multiple sprockets 23A different in outer diameters as one example.

The chain 24 is entrained about any of the sprockets 22A of the first sprocket assembly 22 and any of the sprockets 23A of the second sprocket assembly 23. When the crank 21 rotates forwardly by a human-powered driving force applied to the pedals 25, the sprocket 23A rotates forwardly together with the crank 21. The rotation of the sprocket 23A is transmitted to the second sprocket assembly 23 via the chain 24 to thereby rotate the rear wheel 14. A belt or a shaft can be employed instead of the chain 24.

The human-powered vehicle 1 is provided with the device 30 which is operated by power supplied from the battery 40, and is controlled in its operation by the control device 100. The device 30 includes the transmission device 31 and the assist device 32. The transmission device 31 and the assist device 32 are basically operated through control by the control device 100 in response to an operation performed on the operation device 33.

The transmission device 31 changes a ratio of the rotational speed of the rear wheel 14 to the rotational speed of the crank 21, i.e., the gear ratio of the human-powered vehicle 1. The gear ratio is expressed as a ratio of the output rotational speed output from the transmission device 31 to the input rotational speed input to the transmission device 31. The gear ratio is expressed by the formula: "gear ratio=output rotational speed/input rotational speed." In the first example, the transmission device 31 is an external transmission (rear derailleur) for shifting a coupled state between the second sprocket assembly 23 and the chain 24. In the second example, the transmission device 31 is an external transmission (front derailleur) for shifting a coupled state between the first sprocket assembly 22 and the chain 24. In the third example, it is an internal transmission disposed at a hub of the rear wheel 14. The transmission device 31 can be an infinitely variable transmission.

The assist device 32 assists a human driving force of the human-powered vehicle 1. The assist device 32 includes a motor, for example. As one example, the assist device 32 is located between the crank shaft 21A and the frame 11A, and transmits a torque to the first sprocket assembly 22 to thereby assist the human driving force to the human-powered vehicle 1. More specifically, the assist device 32 is disposed at the interior of a drive unit (not illustrated) disposed near the crank shaft 21A. Note that the drive unit has a case in which the assist device 32 is disposed. The assist device 32 can drive the chain 24 for transmitting a driving force to the rear wheel 14 of the human-powered vehicle 1.

The operation device 33 is disposed at the handlebar 12. The operation device 33 includes one or more user operated members. The user operated members are not limited to those illustrated FIG. 1, and can include, for example, a button, a switch, a lever, a dial and/or a touch screen. Here, as seen in FIG. 1, the operation device 33 includes at least one operation member 33A to be operated by the rider, for example. One example of the operation member 33A is one or more buttons. Another example of the operation member 33A is one or more brake levers. Here, the operation device 33 includes a pair of dual brake-shift levers as the operation members 33A, which are provided at left and right sides of the handlebar 12. The operation members 33A (brake levers) are operable by moving the brake levers sideways towards a center plane of the human-powered vehicle 1. The operation members 33A (the dual brake-shift levers) can also be pivoted in a rearward direction. The information terminal device 7 held by the rider can be used as the operation member 33A. When detecting an operation performed on an operation button, which has been displayed on a display panel included in the information terminal device 7, the information terminal device 7 makes a report to the control device 100.

The operation device 33 includes a pair of transmission designating members 33B. The transmission designating members 33B correspond to multiple buttons that are provided to the operation members 33A. The transmission designating members 33B are devices attached to the dual brake-shift levers. Every time the rider performs the operation of moving one of the brake levers or pressing one of the buttons disposed at the brake lever on the transmission designating member 33B, he or she can perform manual operation on the transmission device 31 to increase the gear ratio or decrease the gear ratio.

The operation device 33 includes an assist designating member 33C. The assist designating member 33C corresponds to buttons included in the operation members 33A, for example. By pressing the assist designating member 33C, the assist mode can be set to multiple stages (high/mean/low). The operation device 33 can be provided with a report unit that makes a report of an operating state.

The operation device 33 is communicably connected to the control device 100 so as to transmit to the control device 100 a signal in response to an operation performed on the operation members 33A, the transmission designating members 33B and the assist designating member 33C. The operation device 33 can communicably be connected to the transmission device 31 and the assist device 32 so as to transmit to the transmission device 31 or the assist device 32 a signal in response to an operation performed on the operation members 33A, the transmission designating members 33B and the assist designating member 33C. In the first example, the operation device 33 communicates with the control device 100 through a communication line or an electric wire that allows for power line communication (PLC). The operation device 33 can communicate with the transmission device 31, the assist device 32 and the control device 100 through a communication line or an electric wire that allows for PLC. In the second example, the operation device 33 wirelessly communicates with the control device 100. The operation device 33 can wirelessly communicate with the transmission device 31, the assist device 32 and the control device 100.

The battery 40 includes a battery main body 41 and a battery holder 42. The battery main body 41 is a rechargeable battery including one or more battery cells. The battery holder 42 is fixed at the frame 11A of the human-powered vehicle 1. The battery main body 41 is attachable to and detachable from the battery holder 42. The battery 40 is electrically connected to the device 30, the operation device 33 and the control device 100 to supply power to them as necessary. The battery 40 preferably includes an electronic controller for communicating with the control device 100. The electronic controller preferably includes a processor employing a CPU.

The human-powered vehicle 1 is provided with the sensor 50 at various sites for detecting a state of the rider and a travel environment. The sensor 50 includes a speed sensor 51, an acceleration sensor 52, a torque sensor 53, a cadence sensor 54, a gyro sensor 55 and a seating sensor 56.

The speed sensor 51 is disposed at the front wheel 13, for example, and transmits to the control device 100 a signal corresponding to the number of rotations per unit time of the front wheel 13. The control device 100 can calculate a vehicle speed and a travel distance for the human-powered vehicle 1 based on the output of the speed sensor 51.

The acceleration sensor 52 is secured at the frame 11A, for example. The acceleration sensor 52 is a sensor for outputting vibrations of the human-powered vehicle 1 in three-axes (front-back direction, right-left direction and up-down direction) relative to the frame 11A and is disposed for detecting a movement and a vibration of the human-powered vehicle 1. The acceleration sensor 52 transmits to the control device 100 a signal corresponding to the magnitude of the movement and vibrations.

The torque sensor 53 is disposed so as to measure respective torques applied to the right crank 21B and the left crank 21C, for example. The torque sensor 53 outputs a signal corresponding to the torque measured at least one of the right crank 21B and the left crank 21C to the control device 100.

The cadence sensor 54 is disposed so as to measure a cadence of any one of the right crank 21B and the left 21C, for example. The cadence sensor 54 transmits a signal corresponding to the measured cadence to the control device 100.

The gyro sensor 55 is secured at the frame 11A, for example. The gyro sensor 55 is disposed so as to detect yaw, roll and pitch rotations of the human-powered vehicle 1. The gyro sensor 55 transmits signals corresponding to the respective rotation amounts in the three axes to the control device 100.

The seating sensor 56 is disposed so as to perform a measurement as to whether or not the rider is seated in the saddle 15. The seating sensor 56 employs a piezoelectric sensor, for example and transmits a signal corresponding to the weight applied to the saddle 15.

Figure 2:
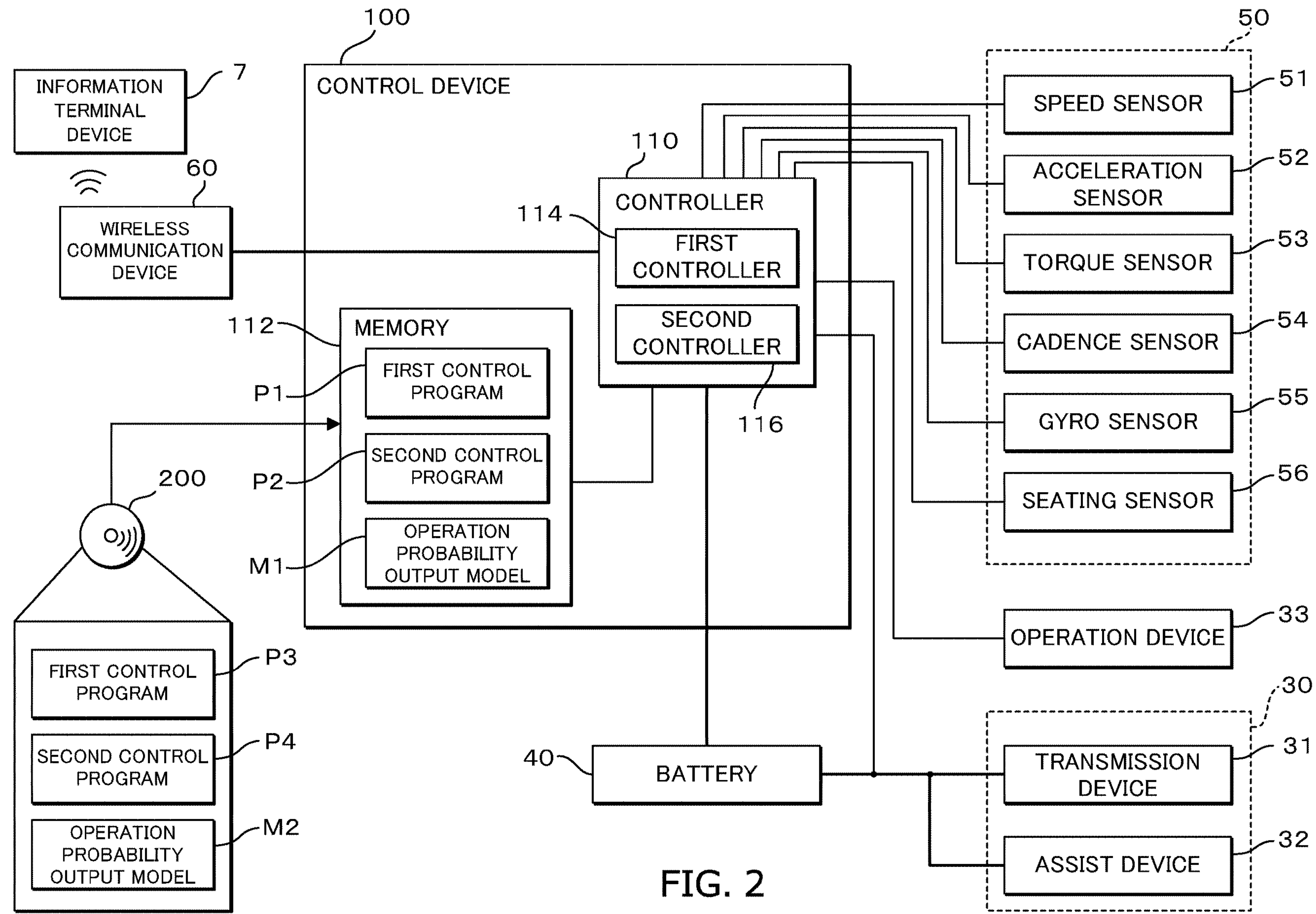
FIG. 2 is a block diagram illustrating the configuration of the control device.

FIG. 2 is a block diagram illustrating the configuration of the control device 100. The control device 100 includes the electronic controller 110 and a storage device 112. The electronic controller 110 is preferably a microcomputer that includes one or more processors. The controller 100 is formed of one or more semiconductor chips that are mounted on a printed circuit board. The terms "controller" and "electronic controller" as used herein refer to hardware that executes a software program, and does not include a human being. The electronic controller 110 can also be simply referred to as the controller 110. The storage device 112 is any computer storage device or any non-transitory computer-readable medium with the sole exception of a transitory, propagating signal. In other words, the term "storage" as used herein refers to a non-transitory computer readable storage. The storage device 112 includes a non-volatile memory such as a flash memory, a hard disk, a ROM (Read Only Memory) device, and so on, for example. Also, for example, the storage device 112 can also include volatile memory such as a RAM (Random Access Memory) device. The storage device 112 can also be simply referred to as the memory 112.

The electronic controller 110 includes at least one processor employing a CPU. The electronic controller 110 uses a memory such as a built-in ROM (Read Only Memory), a RAM (Random Access Memory) and the like. The electronic controller 110 executes separate functions between a first electronic controller 114 and a second electronic controller 116. The first electronic controller 114 can also be simply referred to as the first controller 114. Similarly, the second electronic controller 116 can also be simply referred to as the second controller 116. The first electronic controller 114 and the second electronic controller 116 can share the processor of the electronic controller 110, or each of the first electronic controller 114 and the second electronic controller 116 can a processor. Here, the first electronic controller 114 includes a first circuit and the second electronic controller 116 includes a second circuit, where the processor of the electronic controller 110 is shared between the first circuit and the second circuit.

The first electronic controller 114 acquires input information related to traveling of the human-powered vehicle from the sensor 50. The first electronic controller 114 decides according to a first control program P1 control data of the device 30 based on the acquired input information by using a predetermined control algorithm. The first electronic controller 114 controls the operation of an object to be controlled (hereinafter also referred to as a control object) that is provided at the human-powered vehicle 1 as well as power supply to and communication with the control object based on the decided control data in accordance with the first control program P1.

The second electronic controller 116 evaluates a probability of the rider performing an intervening operation on the automatic control performed on the device 30 by the first electronic controller 114 using an operation probability output model M1 stored in the storage unit 112 (i.e., non-transitory computer readable storage). The second electronic controller 116 executes processing of changing a parameter to decide control data for the first electronic controller 114 according to a second control program P2 in the case where the probability of the rider performing an intervening operation obtained using the operation probability output model M1 is equal to or more than a predetermined value.

The storage unit 112 includes a non-volatile memory such as a flash memory, for example. The storage unit 112 stores the first control program P1 and the second control program P2. The first control program P1 and the second control program P2 can be acquired by the electronic controller 110 reading out a first control program P3 and a second control program P4 stored in a non-transitory recording medium 200 and copying it to the storage unit 112.

The storage unit 112 (i.e., non-transitory computer readable storage) stores the operation probability output model M1. The details of the operation probability output model M1 will be described below. The operation probability output model M1 can also be acquired by the electronic controller 110 reading out an operation probability output model M2 stored in the non-transitory recording medium 200 and copying it to the storage unit 112.

The electronic controller 110 (including the first electronic controller 114 and the second electronic controller 116) communicates with a control object. In this case, the electronic controller 110 can have its own communication unit (not illustrated) intended for the control object, or the electronic controller 110 can be connected to a communication unit intended for the control object provided inside the control device 100. The electronic controller 110 preferably has a connection unit for communicating with the control object or the communication unit.

The electronic controller 110 preferably communicates with the control object by at least one of the PLC communication and the CAN communication. Not limited to a wired communication, the communication performed with the control object by the electronic controller 110 can be a wireless communication such as ANT®, ANT+®, Bluetooth®, Wi-Fi®, ZigBee® or the like.

The electronic controller 110 is connected to the sensor 50 through a signal line. The electronic controller 110 acquires input information related to traveling of the human-powered vehicle 1 from a signal output by the detector 50 through the signal line.

The electronic controller 110 can communicate with the information terminal device 7 of the rider via a wireless communication device 60 having an antenna. The wireless communication device 60 is a hardware device capable of wirelessly transmitting a signal, and does not include a human being. The wireless communication device 60 can be integrated into the control device 100. The wireless communication device 60 is a device that implements communication over the Internet. The wireless communication device 60 can be a device used for wireless communication such as ANT®, ANT+®, Bluetooth®, Wi-Fi®, ZigBee®, Long Term Evolution (LTE) or the like. The wireless communication device 60 can be compliant with a communication network such as 3G, 4G, 5G, a Long Term Evolution (LTE), a Wide Area Network (WAN), a Local Area Network (LAN), an Internet line, a leased line, a satellite channel or the like.

The details of control performed by the control device 100 thus configured will be described. By the function of the first electronic controller 114, the electronic controller 110 of the control device 100 decides control data of the device 30 in accordance with a predetermined control algorithm based on input information acquired from the sensor 50 and automatically controls the device 30 with the decided control data. In the first embodiment, the electronic controller 110 automatically controls the transmission device 31 depending on the magnitude of a cadence by the first electronic controller 114.

Figure 3:
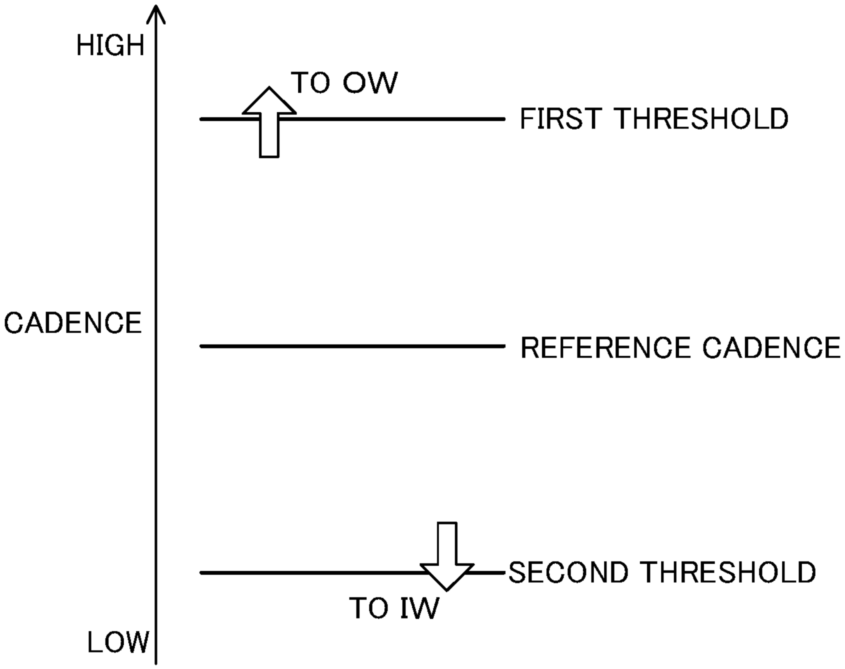
FIG. 3 is a schematic diagram of a control algorithm of a transmission device performed by a first electronic controller.

FIG. 3 is a schematic diagram of a control algorithm of the transmission device 31 performed by the first electronic controller 114. FIG. 3 represents the reference for the change in gear ratio for a cadence acquired from the cadence sensor 54. The magnitude of the cadence is represented vertically. The cadence is indicated so as to increase toward the upper part of FIG. 3. The first electronic controller 114 controls the cadence at the crank 21 so as to fluctuate in the vicinity of the reference cadence. The first electronic controller 114 includes a procedure of deciding a gear ratio by comparing the cadence with a predetermined threshold. For example, in the case where the cadence acquired from the cadence sensor 54 reaches a first threshold or more that is above the reference cadence, the first electronic controller 114 decides to change the gear ratio to the side OW (outward) of a higher gear ratio. That is, the first electronic controller 114 decides the gear ratio higher than the current gear ratio by one stage or by two stages. Conversely, in the case where the cadence reaches a second threshold or lower that is below the first threshold and is below the reference cadence, the first electronic controller 114 decides to change the gear ratio to the side IW (Inward) of a lower gear ratio. That is, the first electronic controller 114 decides the gear ratio lower than the current gear ratio by one stage or by two stages. The first electronic controller 114 controls the cadence to fluctuate in the vicinity of the reference cadence even after change of the gear ratio. The first electronic controller 114 can adjust the timing of controlling the change in the gear ratio to be earlier or later.

The second electronic controller 116 changes the parameter to be used in the control algorithm illustrated in FIG. 3 as necessary. The second electronic controller 116 thus learns the operation probability output model M1 that outputs a probability of the operation as to whether or not the rider wants manual operation, not automatic control. After having finished learning the operation probability output model M1, the second electronic controller 116 inputs input information related to traveling to the operation probability output model M1 while the human-powered vehicle is traveling. The second electronic controller 116 determines that change of the control parameter for the first electronic controller 114 is needed in the case where a probability output from the operation probability output model M1 is equal to or more than a predetermined value. The second electronic controller 116 changes at least one of the first threshold and the second threshold.

Figure 4:
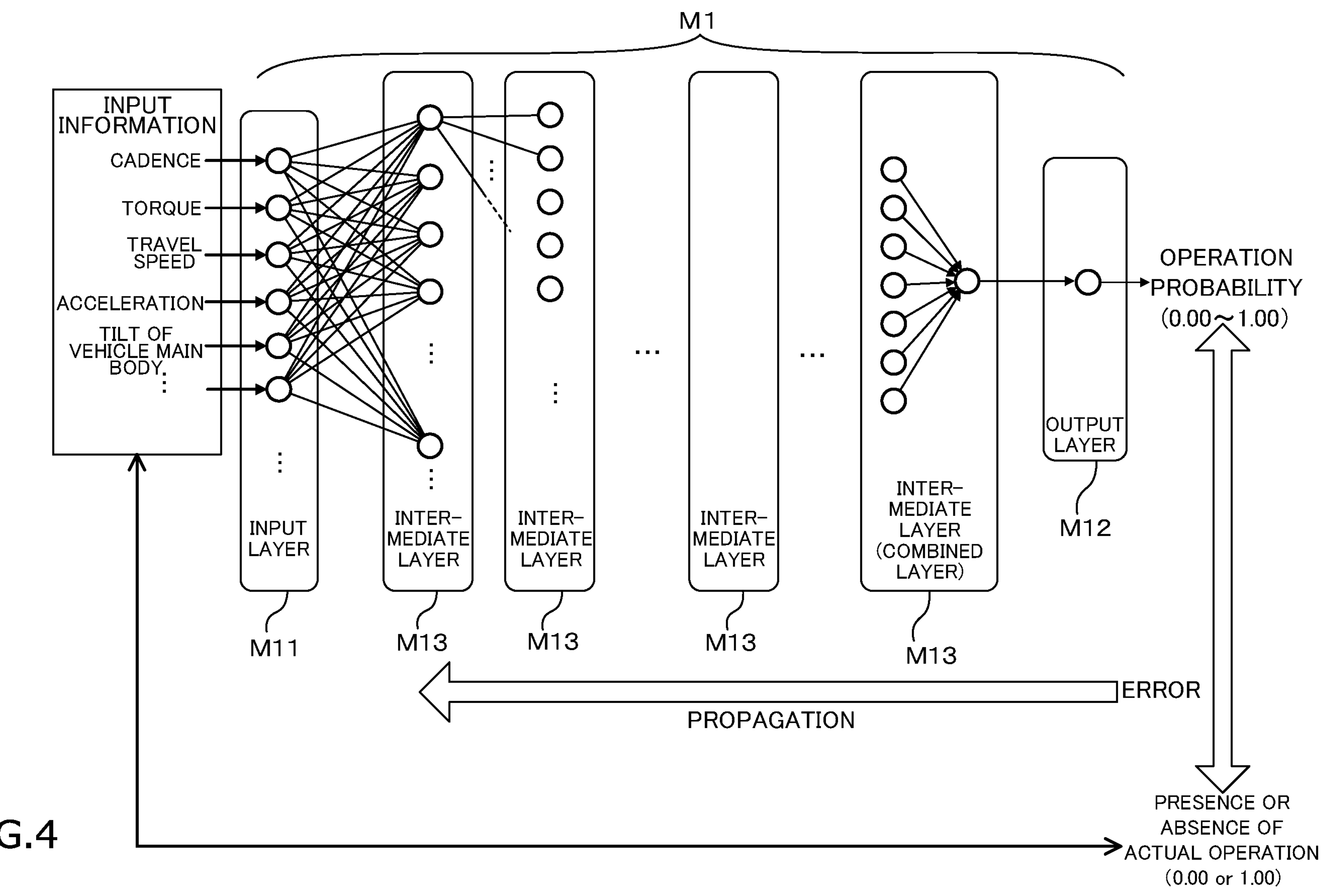
FIG. 4 is a schematic diagram of an operation probability output model.

FIG. 4 is a schematic diagram of the operation probability output model M1. The operation probability output model M1 is a learning model trained by supervised deep learning using a neural network (hereinafter referred to as NN). The operation probability output model M1 can be a model trained by a recurrent neural network (hereinafter referred to as RNN). The operation probability output model M1 is trained so as to output the "probability of the rider performing an intervening operation after a few seconds" in the case where the input information related to the traveling of the human-powered vehicle 1 acquired by the sensor 50 is input.

The operation probability output model M1 has an input layer M11 to which input information is input, an output layer M12 from which a probability of the rider performing an intervening operation is output and an intermediate layer M13 composed of one or more layers each including a group of nodes. The intermediate layer M13 connected to the output layer M12 is a connection layer in which multiple nodes converge into the number of nodes in the output layer M12. The output layer M12 has one node. The nodes in the intermediate layer M13 each have a parameter including at least one of a weight and a bias in association with the node in the previous layer. The operation probability output model M1 is trained by training data including input information, such as a cadence, a torque, a travel speed, an acceleration, a tilt or the like acquired from the sensor 50 when the human-powered vehicle 1 is traveling and the presence or absence of an intervening operation performed on the transmission device 31 by the rider a predetermined time after the input information is acquired as an output label (0: absence, 1: presence). The operation probability output model M1 is trained by retro-propagation, to the intermediate layer M13, the error between a numerical value that is output from the output layer M12 when input information out of the training data is input to the input layer M11 and the label associated with the input information, and by updating the parameters of the nodes in the intermediate layer M13.

Not only input information such as a cadence, a torque, a vehicle speed, an acceleration, a tilt or the like that can be acquired from the sensor 50 is directly input to the input layer M11 at respective time points but also the changed amount in the latest few seconds (e.g., two seconds) can be input to the learning model M1. The operation probability output model M1 can be trained so as to output an operation probability while affected by the input information previously input by the RNN.

Since the operation probability output model M1 needs to be trained for each rider, it is stored in the storage unit 112 in a trained state to some extent prior to the delivery of the control device 100. As a training unit of the control device 100, the second electronic controller 116 trains the operation probability output model M1 after the human-powered vehicle 1 is shipped and purchased as described below.

Figure 5:
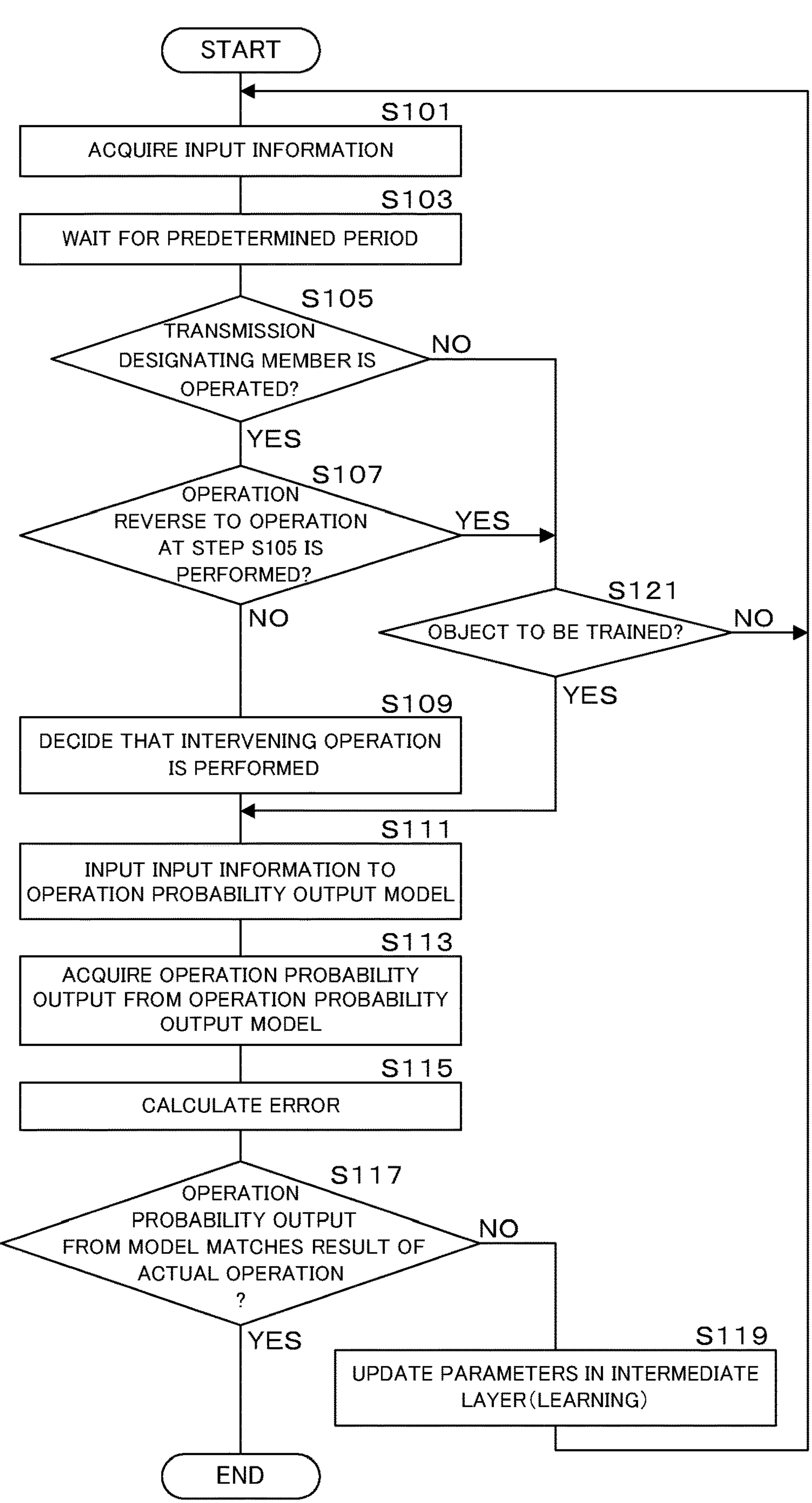
FIG. 5 is a flowchart illustrating one example of a processing procedure of training the operation probability output model.

FIG. 5 is a flowchart illustrating one example of a processing procedure of training the operation probability output model M1. The second electronic controller 116 functions as the training unit for training the operation probability output model M1 by executing the following processing based on the second control program P2 in a state that automatic control by the first electronic controller 114 is performed.

The second electronic controller 116 acquires input information from the sensor 50 (step S101), waits for a predetermined time (one to three seconds) (step S103) and determines whether or not the transmission designating member 33B is operated (step S105).

If it is determined that the transmission designating member 33B is operated (S105: YES), the second electronic controller 116 determines whether or not an operation reverse to the operation at step S105 is performed on the transmission designating member 33B immediately after (e. g. within 2 seconds) (step S107).

If it is determined that the reverse operation is not performed (S107: NO), the second electronic controller 116 decides that an intervening operation is performed (presence of operation) (step S109).

At step S101, the second electronic controller 116 continues to buffer data corresponding to a predetermined time period (e. g. five seconds) from the latest data as to the input information such as a cadence, a torque, a vehicle speed, an acceleration, a tilt or the like in the RAM. The second electronic controller 116 can acquire input information before a predetermined time at a stage where it is determined that the reverse operation is not performed at step S107.

The second electronic controller 116 inputs the input information acquired at step S101 to the input layer M11 of the under-training operation probability output model M1 (step S111). The second electronic controller 116 acquires an operation probability that is output from the output layer M12 of the operation probability output model M1 in response to the processing at step S111 (step S113). The second electronic controller 116 calculates an error between the output from the operation probability output model M1 at step S113 and the decided operation details as to the presence or absence of an operation by means of a predetermined error function (step S115).

The second electronic controller 116 determines whether or not the calculated error is equal to or less than a predetermined value and whether or not the operation probability output from the operation probability output model M1 matches the result as to whether an actual intervening operation is performed by the rider at step S105 within the range of a predetermined matching ratio (step S117). At step S117, the second electronic controller 116 can determine matching depending on whether or not the latest several errors are consecutively equal to or less than the predetermined value. At step S117, the second electronic controller 116 can determine matching depending on whether or not the average of the errors falls within a predetermined value. Alternative to step S117, the second electronic controller 116 can end the learning depending on whether or not a predetermined number of times is reached.

If it is determined that they do not match each other (S117: NO), the second electronic controller 116 updates the parameters in the intermediate layer M13 by the calculated error (step S119) and returns the processing to step S101.

If it is determined that they match each other (S117: YES), the second electronic controller 116 ends the learning processing and starts processing by the second electronic controller 116 using the trained operation probability output model M1.

If it is determined that the transmission designating member 33B is not operated (S105: NO), the second electronic controller 116 determines whether or not this is regarded as an object to be trained (step S121). If the transmission designating member 33B is not operated, the second electronic controller 116 executes the determination processing at step S121 in order to randomly set the absence of an operation as training data. In the case where a predetermined time has elapsed since the latest operation was performed on the transmission designating member 33B or since it was determined to be an object to be trained most recently at step S121, for example, the second electronic controller 116 determines that this is regarded as an object to be trained. In the case where a predetermined number of input information have been obtained since the latest operation was performed on the transmission designating member 33B or since it was determined to be an object to be trained most recently at step S121, for example, the second electronic controller 116 determines that this is regarded as an object to be trained with reference to the amount of data.

If it is determined that this is regarded as the object to be trained (S121: YES), the second electronic controller 116 advances the processing to step S111 to perform the learning with the label of no operation (0: absence of operation) (S111 to S115).

If it is determined that this is not regarded as the object to be trained at step S121 (S121: NO), the second electronic controller 116 returns the processing to step S101 to perform the next learning processing.

If it is determined a reverse operation is performed at step S107 (S107: YES), the second electronic controller 116 advances the processing to step S121. This is to avoid learning when an erroneous operation is performed.

This allows the second electronic controller 116 to predict whether or not a manual operation is to be performed by the rider after several seconds based on the input information corresponding to the travel state of the human-powered vehicle 1 using the operation probability output model M1. During a period when the human-powered vehicle 1 is brand new and has just been delivered, the first electronic controller 114 does not perform control to change the gear ratio unless the cadence reaches the first threshold while the rider can feel the need of changing it. The operation probability output model M1 outputs a quantified value of the probability of the rider making a change.

Figure 6:
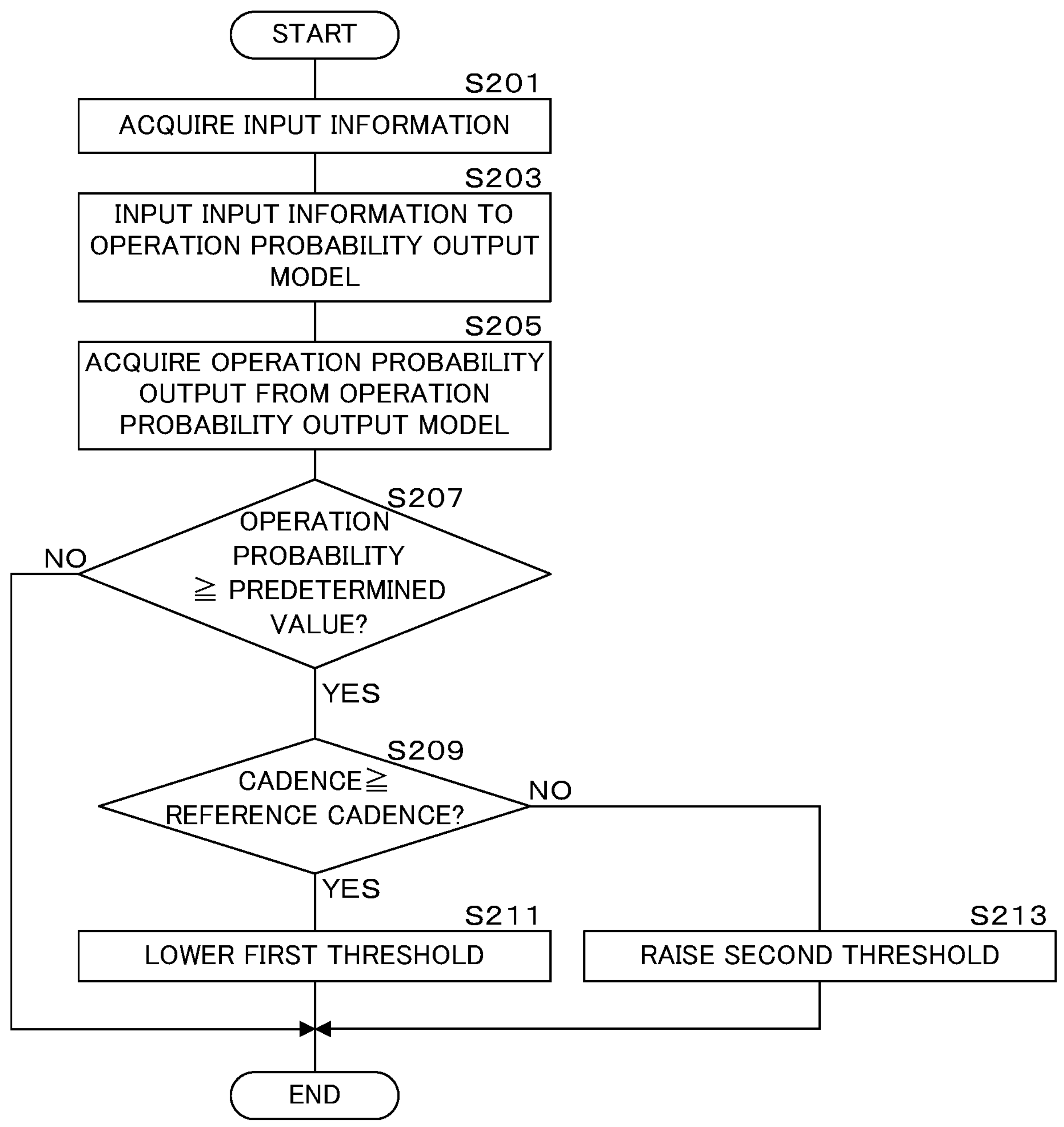
FIG. 6 is a flowchart illustrating one example of a processing procedure of changing a control parameter performed by a second electronic controller.

FIG. 6 is a flowchart illustrating one example of a processing procedure of changing a control parameter performed by the second electronic controller 116. The second electronic controller 116 executes the following processing after it is determined that training of the operation probability output model M1 by the processing procedure illustrated in FIG. 5 is finished.

The second electronic controller 116 acquires input information from the sensor 50 (step S201) and inputs the acquired input information to the trained operation probability output model M1 (step S203). The second electronic controller 116 acquires an operation probability output from the operation probability output model M1 (step S205). The second electronic controller 116 determines whether or not the operation probability acquired from the operation probability output model M1 is equal to or more than a predetermined value (step S207). If it is determined that the operation probability is equal to or more than the predetermined value (S207: YES), the second electronic controller 116 determines whether or not the cadence is equal to or higher than the reference cadence (step S209). If it is determined that the cadence is equal to or higher than the reference cadence (S209: YES), the second electronic controller 116 lowers the first threshold used for deciding control data by the first electronic controller 114 (step S211) and ends the processing.

If it is determined that the cadence is lower than the reference cadence at step S209 (S209: NO), the second electronic controller 116 raises the second threshold used for deciding control data by the first electronic controller 114 (step S213) and ends the processing.

The second electronic controller 116 performs lowering the first threshold at step S211 and raising the second threshold at step S213 discretely, not successively. If the first threshold is initially 90 rpm (revolutions per minute), the second electronic controller 116 lowers "90" to "85." If the second threshold is initially 60 rpm, the second electronic controller 116 raises "60" to "65."

At step S209, the second electronic controller 116 can perform determination depending on whether or not the cadence is rising. The second electronic controller 116 lowers the first threshold if it is determined that the cadence is rising and raises the second threshold if it is determined that the cadence is falling. At step S209, the second electronic controller 116 can change the direction of change depending on a part of the range of cadence, divided by the first and second thresholds, the cadence acquired at step S201 falls in. The second electronic controller 116 can lower the first threshold if the cadence is in the part more toward the first threshold than the middle between the first threshold and the second threshold and can raise the second threshold if the cadence is in the part more toward the second threshold than the middle between them.

In place of changing the parameter (threshold) at step S211 or S213, the second electronic controller 116 can adjust the timing of changing the gear ratio to be earlier.

The second electronic controller 116 executes the processing from steps S201 to S213 such that the time from the acquisition of the input information to the change of the control parameter falls within the time difference between the input information in the training data of the operation probability output model M1 and the output label (a predetermined time, such as one to three seconds).

If it is determined that the operation probability is less than the predetermined value (S207: NO), the second electronic controller 116 ends the processing since the probability of the rider performing the intervening operation is low.

Figure 7:
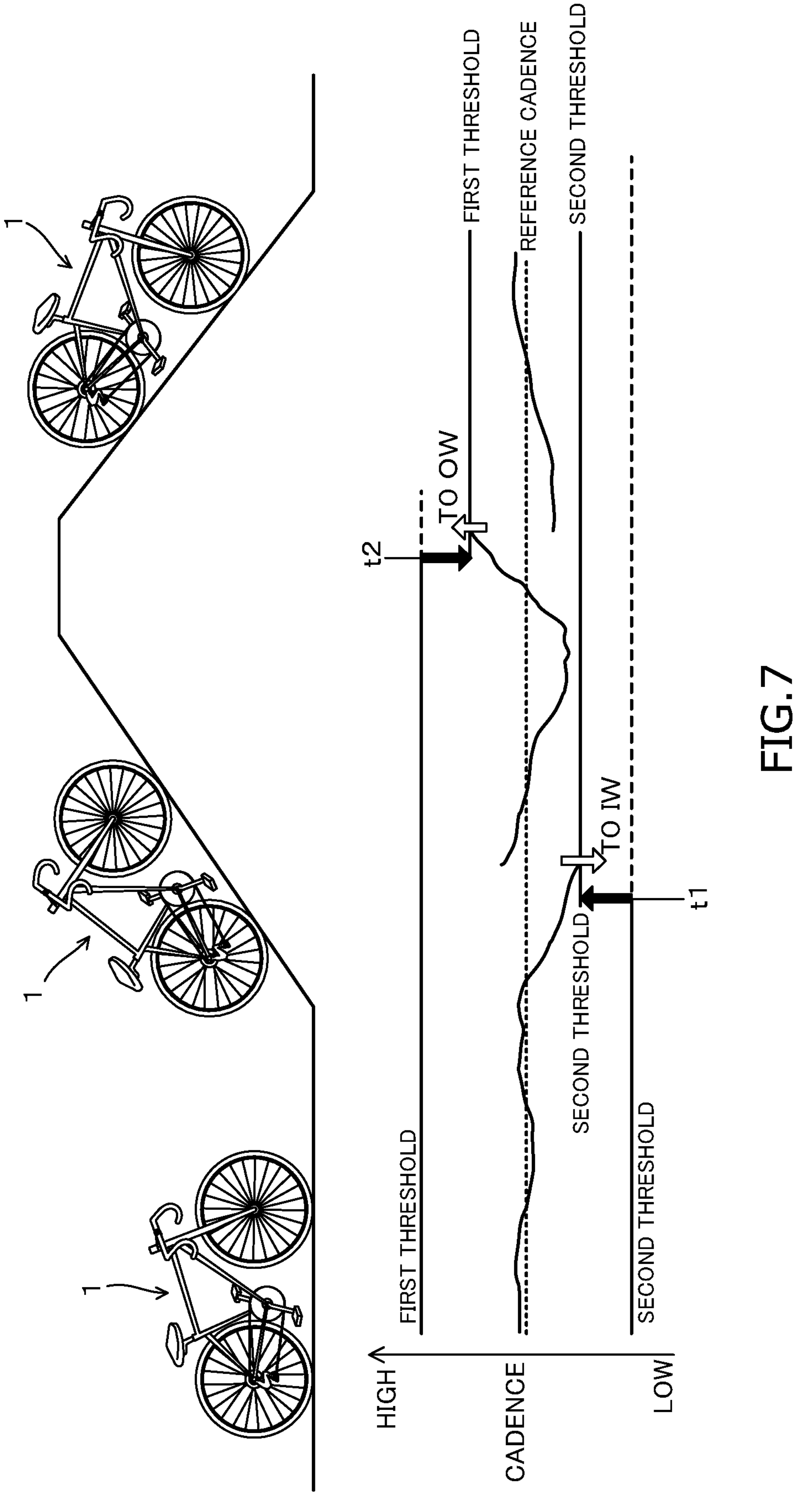
FIG. 7 is a graph showing changes in cadence and threshold.

The processing procedure illustrated in the flowchart in FIG. 6 will be described using a specific example. FIG. 7 is a graph showing changes in cadence and thresholds. FIG. 7 horizontally indicates the progress of the human-powered vehicle 1 and graphically shows the change in cadence. The human-powered vehicle 1 maintains its cadence at the reference cadence while traveling on a flat road. When the human-powered vehicle 1 starts to climb the slope, its cadence falls. The first electronic controller 114 does not change the gear ratio unless the cadence reaches the original second threshold even though it falls. During this time period, the second electronic controller 116 raises the second threshold based on the input information such as the speed, the acceleration, the tilt of the human-powered vehicle 1 and the torque applied to crank 21 other than the cadence. This allows the first electronic controller 114 to change to make the gear ratio smaller before any intervening operation is performed by the rider, with reference to the second threshold, which is higher than the original second threshold.

Hence, the operation probability output model M1 predicts the rider's intention to drive the human-powered vehicle 1 depending on the situation, and the automatic control by the first electronic controller 114 is optimized to suit the rider's intention.

Second Embodiment

In the second embodiment, training of the operation probability output model M1 is performed by using, as a label, the rider's discomfort level during traveling, rather than the presence or absence of an actual operation by the rider. The configuration of the control device 100 according to the second embodiment is similar to that of the first embodiment except for learning processing of the operation probability output model M1 to be described later. Accordingly, the parts common to the first embodiment in the configuration of the control device 100 according to the second embodiment are denoted by the same reference codes and detailed description thereof will not be repeated.

Since there can be a case where the rider does not actually perform an operation even if he/she has an uncomfortable feeling about automatic control by the first electronic controller 114, the second electronic controller 116 according to the second embodiment calculates the rider's discomfort level sets the magnitude of the discomfort as a label corresponding to the height of the probability of the rider performing an intervening operation and trains the operation probability output model M1, by the function as a training unit.

Figure 8:
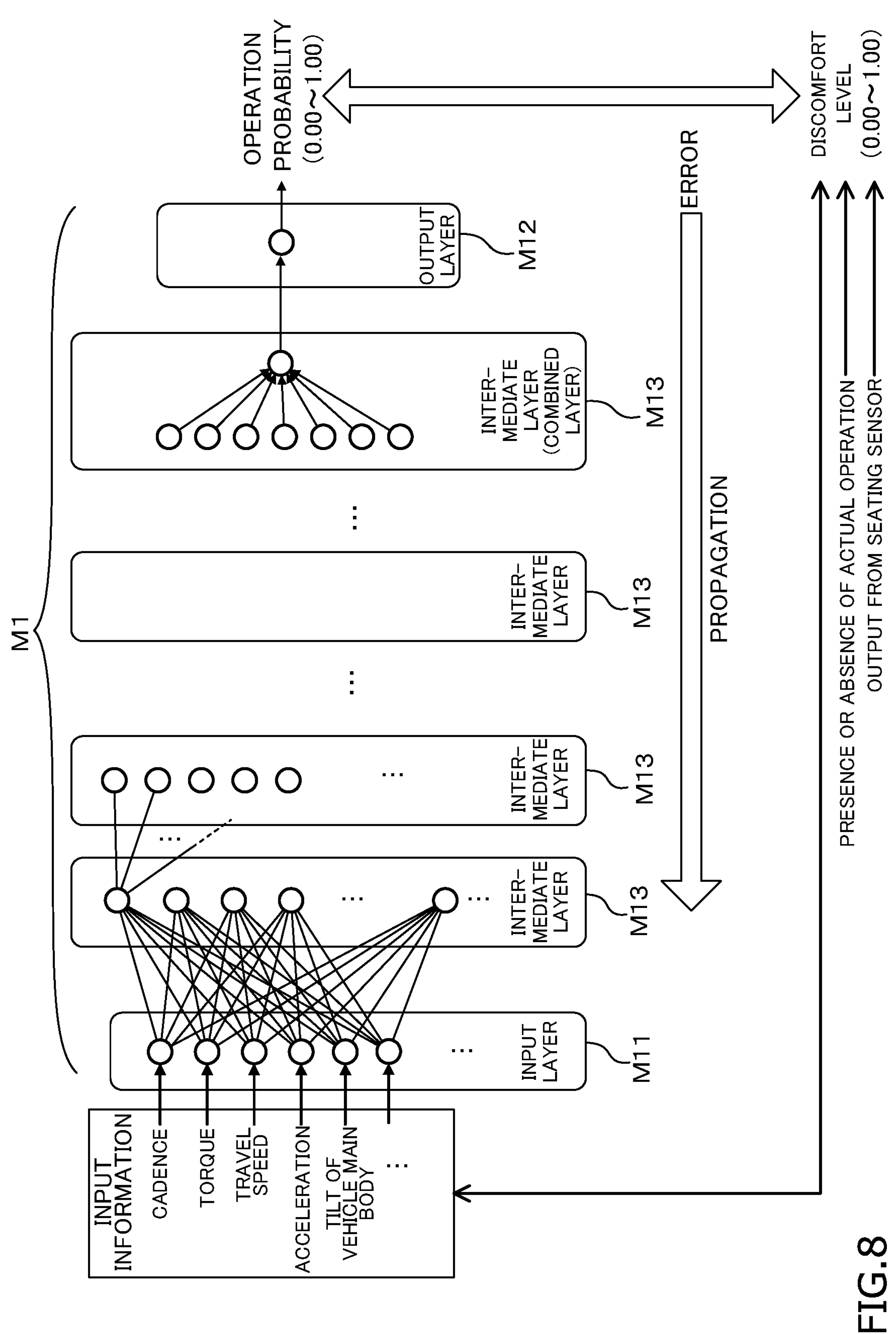
FIG. 8 is a schematic diagram of an operation probability output model according to a second embodiment.

FIG. 8 is a schematic diagram of the operation probability output model M1 according to the second embodiment. As in the first embodiment, the operation probability output model M1 is trained so as to output the "probability of the rider performing an intervening operation after a few seconds" in the case where the input information related to traveling of the human-powered vehicle 1 acquired by the sensor 50 is input. The operation probability output model M1 according to the second embodiment is trained by training data including input information such as a cadence, a torque, a travel speed, an acceleration, a tilt or the like that can be acquired from the sensor 50 and a value (0-1) as a label corresponding to the rider's discomfort a predetermined time after the input information is acquired. The operation probability output model M1 is trained by retropropagation, to the intermediate layer M13, the error between the numerical value (0-1) that is output from the output layer M12 when input information of the training data is input to the input layer M11 and the discomfort label (0-1) associated with the input information of the training data, and by updating the parameters of the nodes in the intermediate layer M13.

Figure 9:
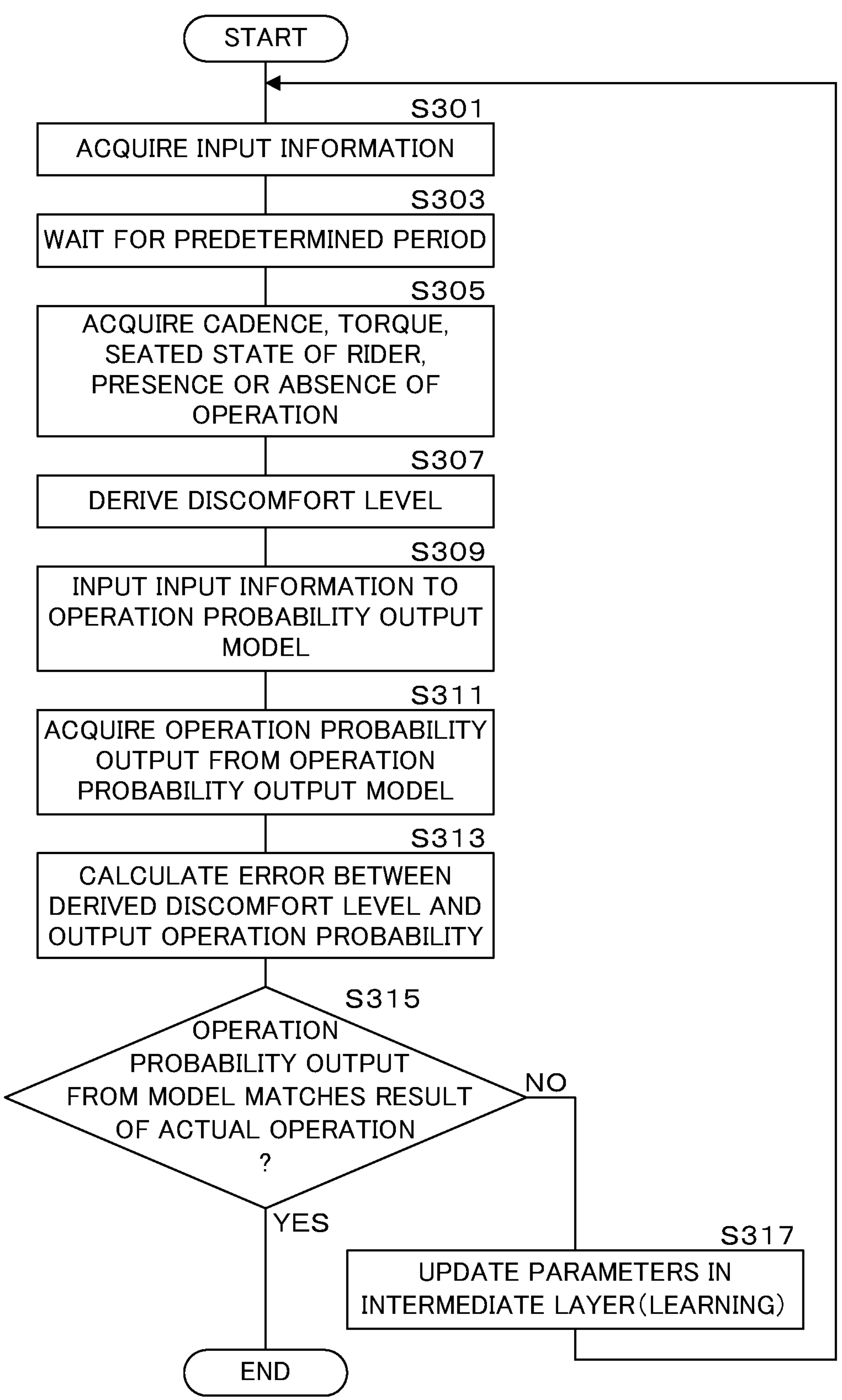
FIG. 9 is a flowchart illustrating one example of a processing procedure of training the operation probability output model according to the second embodiment.

FIG. 9 is a flowchart illustrating one example of the processing procedure of training the operation probability output model M1 according to the second embodiment. The second electronic controller 116 according to the second embodiment functions as a training unit that trains the operation probability output model M1 by executing the following processing based on the second control program P2 in a state that automatic control by the first electronic controller 114 is performed.

The second electronic controller 116 acquires input information from the sensor 50 (step S301), waits for a predetermined time (e. g. one to three seconds) (step S303) and acquires again a cadence, a torque, a seated state of the rider from the sensor 50 and the presence or absence of an operation performed on the transmission designating member 33B (step S305).

At step S305, the second electronic controller 116 can acquire biological information of the rider. The information terminal device 7 held by the rider acquires data from a biological sensor such as a pulse sensor, a blood flow sensor or the like, and transmits the data to the electronic controller 110. This allows the second electronic controller 116 to acquire the biological information of the rider. By having provided a camera as one example of the device 30 at the handlebar 12 and photographing the facial expression of the rider by the camera, the second electronic controller 116 can acquire the result of the photographing as biological information. By having provided a sweating sensor as an example of the device 30 at the handlebar 12, the second electronic controller 116 can acquire an output from the sweating sensor as biological information.

At steps S301 and S305, the second electronic controller 116 continues to buffer in the RAM data in time series corresponding to a predetermined time period (e. g. five seconds) from the latest data as to the input information that can be acquired from the sensor 50 and the presence or absence of an operation performed on the transmission designating member 33B. The second electronic controller 116 can read at a constant cycle information on a cadence and the like, the presence or absence of an operation performed on the transmission designating member 33B and the input information before several seconds to thereby acquire the information.

The second electronic controller 116 derives a rider's discomfort level based on the information such as a cadence or the like acquired at step S303 (step S307). At step S307, the rider's discomfort level is derived based on at least one of the magnitude of the cadence of the human-powered vehicle 1, the magnitude of the torque of the human-powered vehicle 1, the seated state of the rider, and the biological information of the rider. At step S307, the second electronic controller 116 so derives that the discomfort level is higher as the cadence increases and that the rider's discomfort level is higher in the case where the rider is not seated. This is because the rider cannot continuously pedal the human-powered vehicle without driving it with considerable force if he or she is pedaling while standing up, not seated. The second electronic controller 116 can so derives that the discomfort level is higher as the pulse is faster and the blood flow is more. The second electronic controller 116 can derive the rider's discomfort level by using a function employed to calculate the rider's discomfort level using at least one of a cadence, a torque, information about whether or not the rider is seated, and biological information as a variable.

The second electronic controller 116 inputs the input information acquired at step S301 to the input layer M11 of the under-training operation probability output model M1 (step S309). The second electronic controller 116 acquires an operation probability that is output from the output layer M12 of the operation probability output model M1 in response to the processing at step S309 (step S311). The second electronic controller 116 calculates an error between the output from the operation probability output model M1 obtained at step S309 and the rider's discomfort level derived at step S307 by using a predetermined error function (step S313).

The second electronic controller 116 determines whether or not the result as to the presence or absence of an operation acquired at step S305 matches the operation probability acquired at step S311 within a predetermined matching ratio (step S315). If it is determined that they match (S315: YES), the second electronic controller 116 ends the learning processing and starts processing by the second electronic controller 116 using the trained operation probability output model M1.

If it is determined that they do not match (S315: NO), the second electronic controller 116 updates the parameters in the intermediate layer M13 by the errors calculated by the processing at step S313 (step S317) and returns the processing to step S301.

The second electronic controller 116 changes the threshold used in control of deciding a gear ratio by comparing the cadence and the threshold as in the first embodiment, using the operation probability output model M1 that has been trained by means of the learning method described in the second embodiment.

Third Embodiment

Control of the transmission device 31 by the first electronic controller 114 comparing input information (cadence) and a threshold can vary depending on each traveling condition. The control performed by the first electronic controller 114 depending on traveling conditions and the operation probability output model M1 will be described below.

The configuration of the control device 100 in the third embodiment is similar to that in the first embodiment except for storing of multiple operation probability output models M1 and processing described below. The parts common to the first embodiment in the configuration of the control device 100 according to the third embodiment are denoted by the same reference codes and detailed description thereof will not be repeated.

Figure 10:
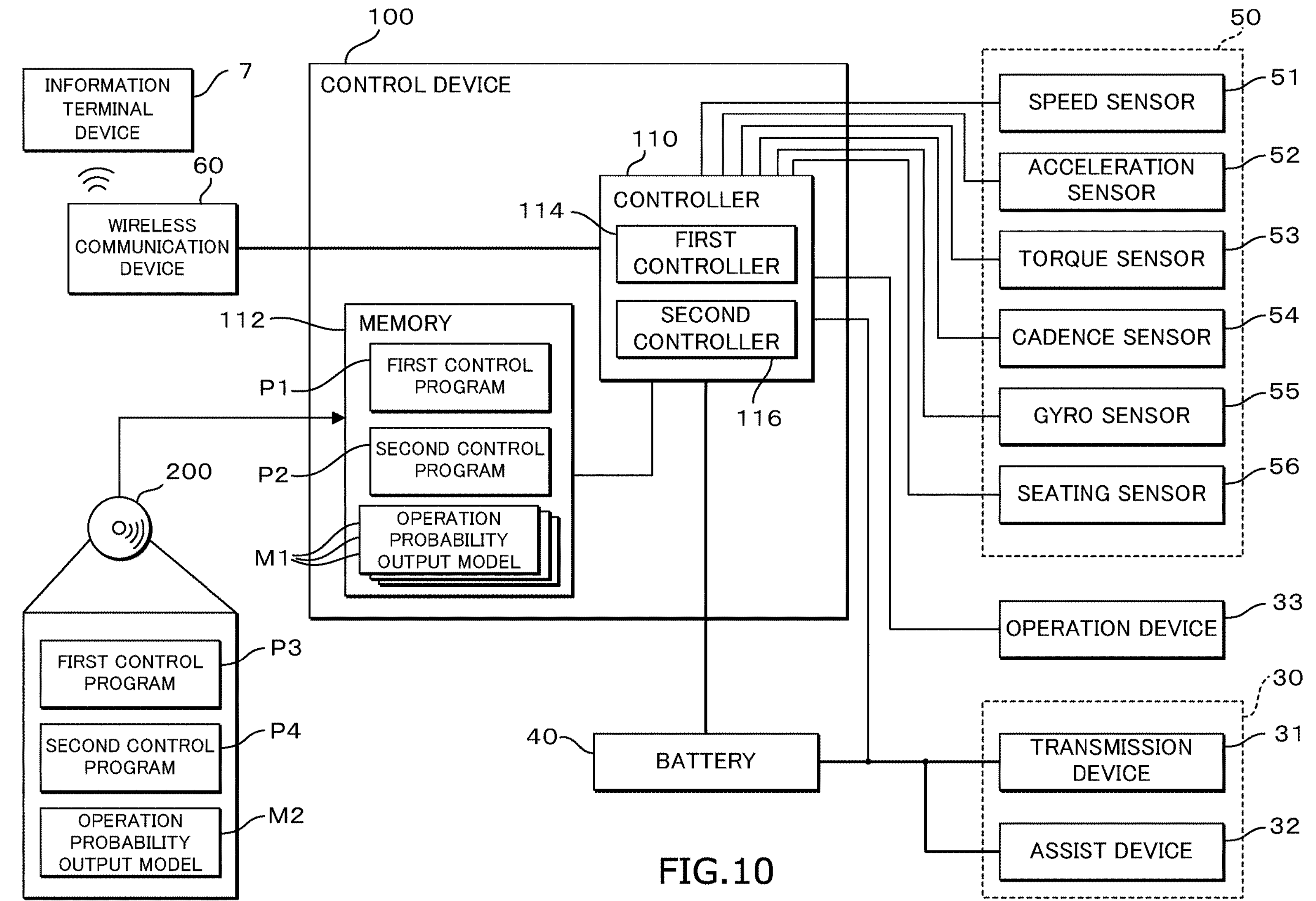
FIG. 10 is a block diagram illustrating the configuration of a control device according to a third embodiment.

FIG. 10 is a block diagram illustrating the configuration of the control device 100 according to the third embodiment. The control device 100 according to the third embodiment stores multiple operation probability output models M1 in the storage unit 112. The operation probability output models M1 are trained depending on the traveling conditions.

Figure 11:
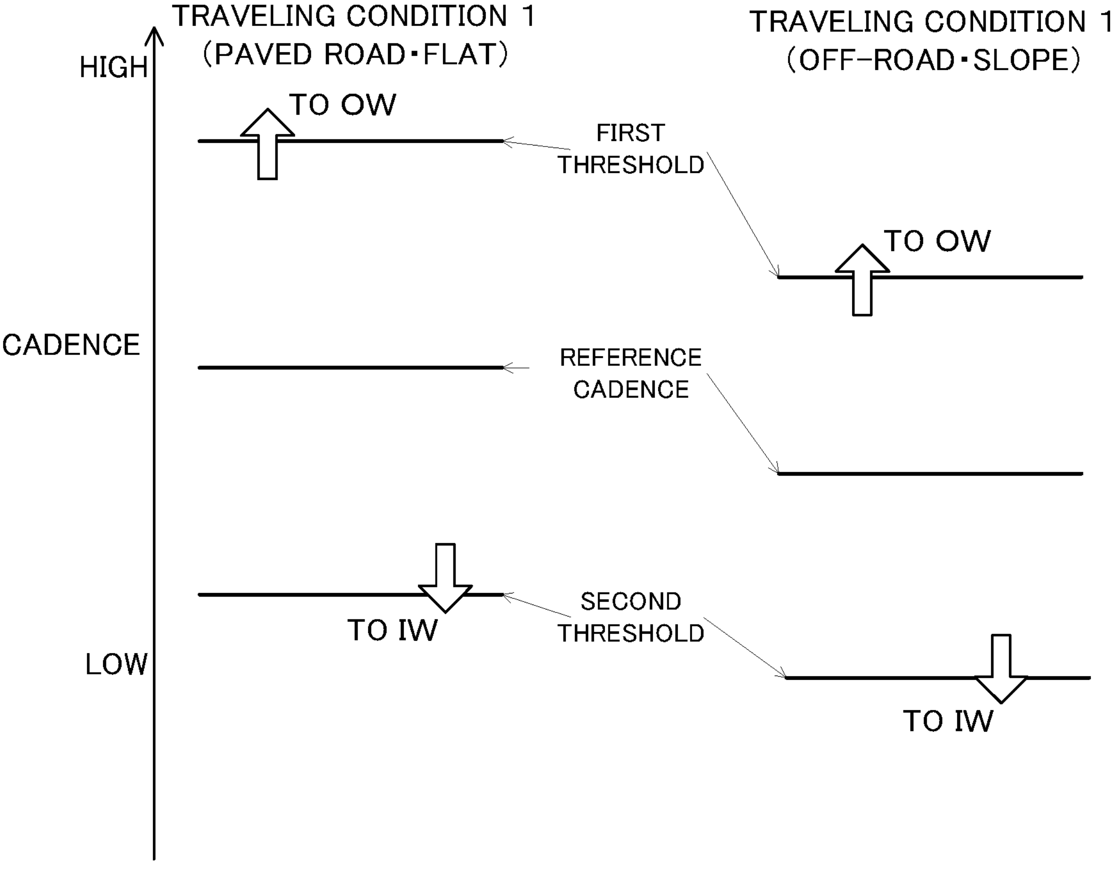
FIG. 11 is a schematic diagram of a control algorithm of a transmission device performed by a first electronic controller according to the third embodiment.

FIG. 11 is a schematic diagram of a control algorithm of the transmission device 31 performed by the first electronic controller 114 according to the third embodiment. As illustrated in FIG. 11, the first electronic controller 114 identifies a traveling condition as an off-road, a paved road or bad weather, for example, and decides the gear ratio of the transmission device 31 using a threshold according to the traveling condition. In the example illustrated in FIG. 11, the first electronic controller 114 decides a gear ratio by different values of a first threshold and a second threshold used for each of the traveling condition "paved road (flat)" and the traveling condition "off-road (slope)." The first electronic controller 114 can identify the traveling condition from a travel speed or a tilt of the vehicle main body acquired from the sensor 50, or can identify the traveling condition in response to an operation performed by the rider on a mode selection button located on the operation members 33A of the operation device 33.

Figure 12:
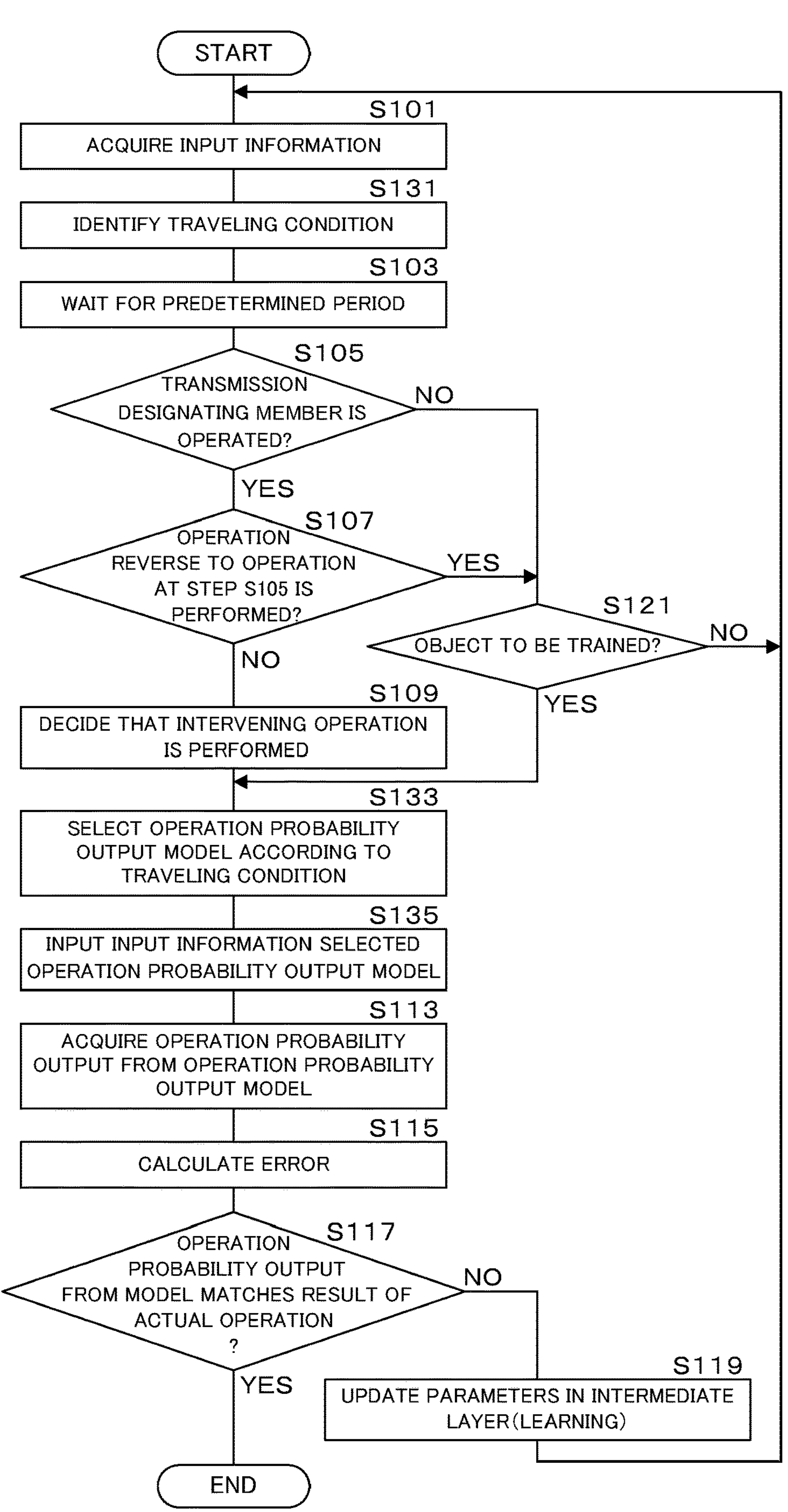
FIG. 12 is a flowchart illustrating one example of a processing procedure of training an operation probability output model according to the third embodiment.

FIG. 12 is a flowchart illustrating one example of the learning processing procedure of the operation probability output model M1 according to the third embodiment. The processing procedures of the flowchart in FIG. 12 common to those of the flowchart in FIG. 5 according to the first embodiment are denoted by the same step numbers and detailed description thereof will not be repeated.

The second electronic controller 116 acquires input information at step S101 (S101) and then identifies a traveling condition based on the input information (step S131) while waiting for a predetermined time (S103). As described above, the traveling condition can be identified from a travel speed or a tilt of the vehicle body acquired from the sensor 50 or can be identified in response to an operation performed by the rider on the mode selection button located on the operation members 33A of the operation device 33.

The second electronic controller 116 executes the processing from steps S105 to S109 and then selects one of the under-training operation probability output models M1 according to the traveling condition (step S133). The second electronic controller 116 inputs the input information to the selected under-training operation probability output model M1 (step S135) and then executes the processing at steps S113 to S119 on the selected under-training operation probability output model M1 thereafter.

Thus, the multiple operation probability output models M1 are trained depending on the traveling conditions and become available.

Figure 13:
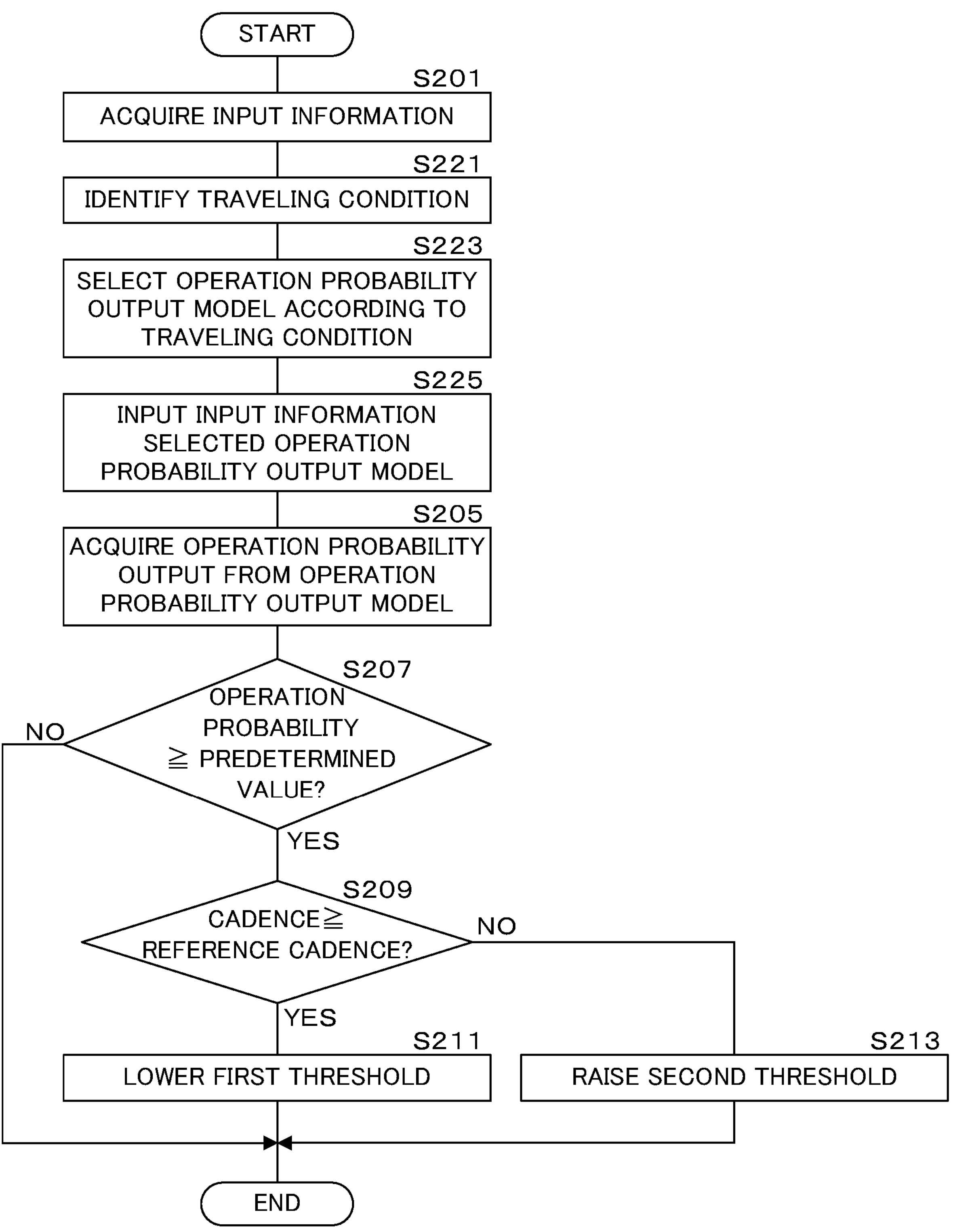
FIG. 13 is a flowchart illustrating one example of a processing procedure of changing a parameter performed by a second electronic controller according to the third embodiment.

FIG. 13 is a flowchart illustrating one example of a processing procedure of changing a parameter performed by the second electronic controller 116 according to the third embodiment. The processing procedures of the flowchart in FIG. 13 common to those of the flowchart in FIG. 6 according to the first embodiment are denoted by the same step numbers and detailed description thereof will not be repeated.

The second electronic controller 116 according to the third embodiment acquires input information from the sensor 50 (S201) and identifies a traveling condition based on the input information (step S221). The second electronic controller 116 selects one of the trained operation probability output models M1 according to the traveling condition (step S223). The second electronic controller 116 inputs the input information acquired at step S201 to the selected trained operation probability output model M1 (step S225) and executes the processing at and after step S205.

In the third embodiment, even in the case where the electronic controller 110 performs precise automatic control depending on the thresholds (parameters) for the respective traveling conditions, the automatic control can be optimized to suit the specific habit and preference for each individual rider.

Fourth Embodiment

The operation probability output model M1 used in the first to third embodiments is a model that is trained so as to output a probability of the rider performing an operation on the automatic control. In a fourth embodiment, the second electronic controller 116 changes the parameter to which the first electronic controller 114 refers by using an operation content prediction model M3 that predicts an operation content to be performed on the device 30 by the rider.

Figure 14:
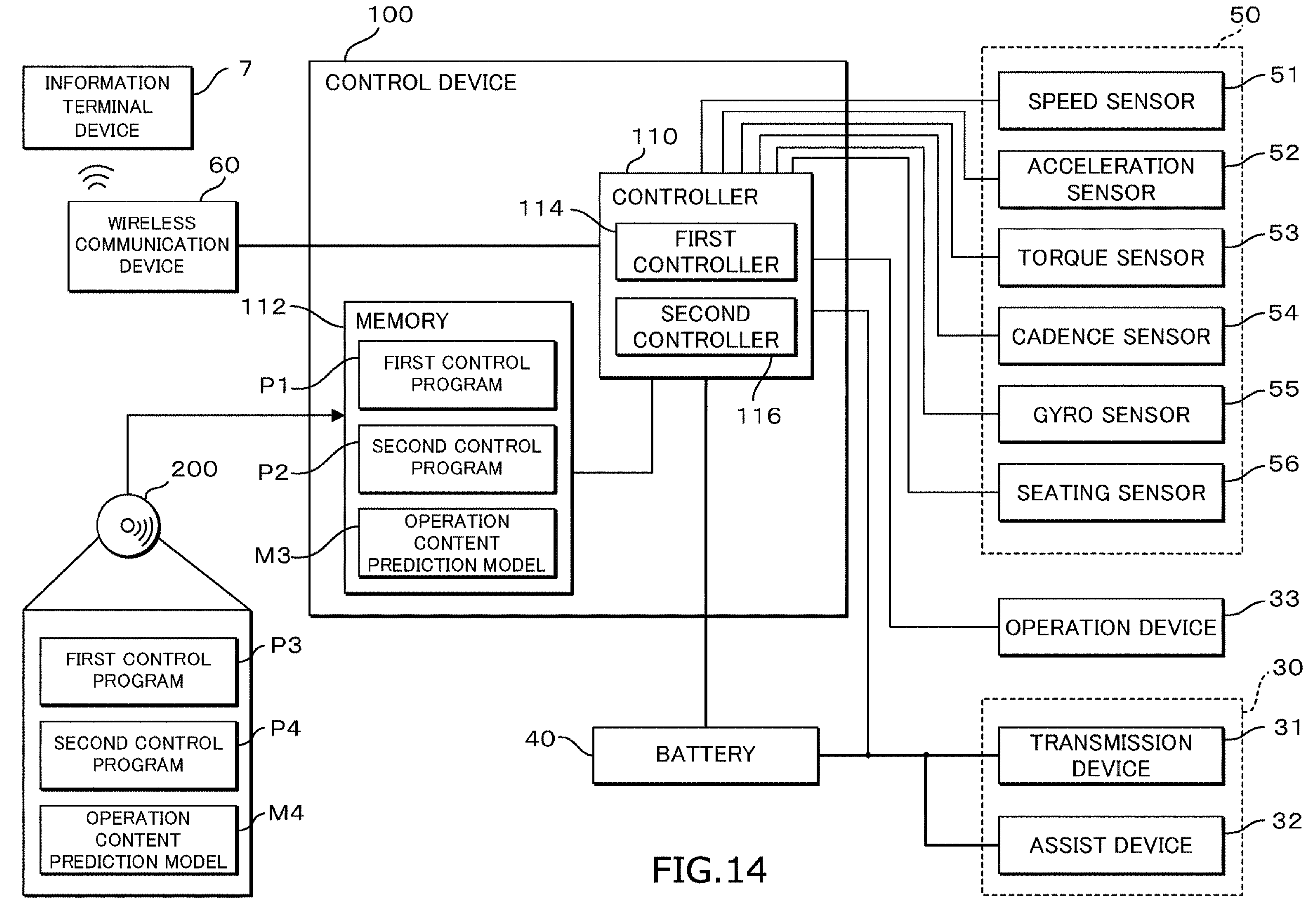
FIG. 14 is a block diagram illustrating the configuration of a control device according to a fourth embodiment.

FIG. 14 is a block diagram illustrating the configuration of the control device 100 according to the fourth embodiment. The parts common to the first embodiment in the configuration of the control device 100 according to the fourth embodiment are denoted by the same reference codes and detailed description thereof will not be repeated.

The control device 100 according to the fourth embodiment stores the operation content prediction model M3 in the storage unit 112. The operation content prediction model M3 can also be obtained by the electronic controller 110 reading out an operation content prediction model M4 stored in the non-transitory recording medium 200 and copying it to the storage unit 112.

In the control device 100 according to the fourth embodiment, the first electronic controller 114 decides a transmission ratio of the transmission device 31 of the human-powered vehicle 1 in accordance with a predetermined control algorithm as in the first electronic controller 114 according to the first to fourth embodiments and automatically controls the transmission device 31 with the decided ratio. The first electronic controller 114 includes a procedure of deciding a gear ratio by comparing the cadence with a predetermined threshold. In the control device 100 according to the fourth embodiment, the second electronic controller 116 employs the operation content prediction model M3 used to predict the details of the operation that the rider wants by a manual operation, not automatic control, during traveling on the human-powered vehicle 1 and to predict an operation content to be performed on the transmission device 31 by the rider. In the fourth embodiment, the second electronic controller 116 predicts whether the rider changes the transmission device 31 so as to increase the gear ratio (OW) or to decrease the gear ratio (IW), or not to change the gear ratio (absence of an operation) using the operation content prediction model M3. In the case where the operation content prediction model M3 predicts to make a change so as to increase the gear ratio, the second electronic controller 116 changes the first threshold (parameter) such that the first electronic controller 114 easily decides to make a change so as to increase the gear ratio In the case where the operation content prediction model M3 predicts to make a change so as to decrease the gear ratio, the second electronic controller 116 changes the second threshold (parameter) such that the first electronic controller 114 easily decides to make a change so as to decrease the gear ratio.

Figure 15:
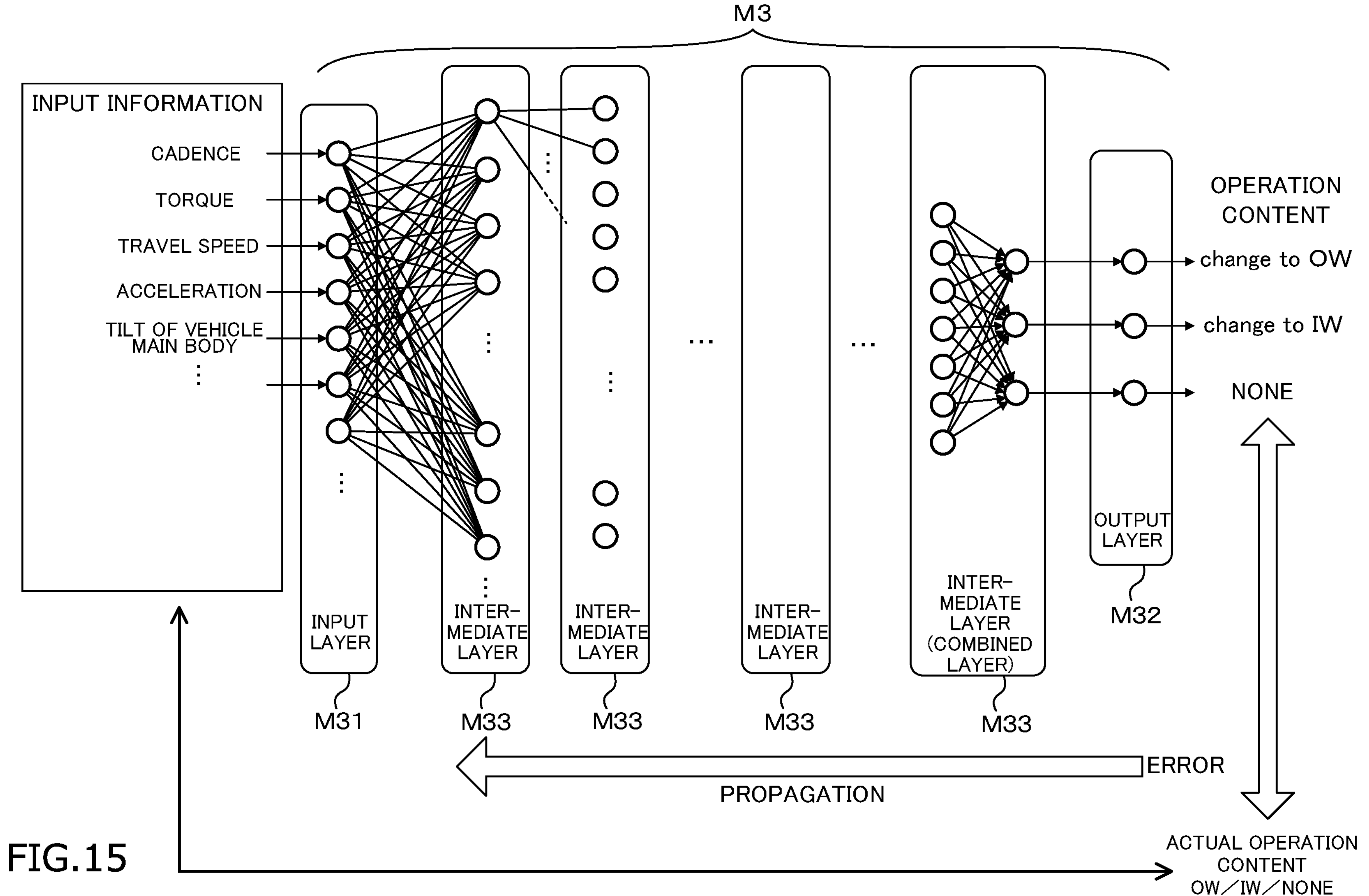
FIG. 15 is a schematic diagram of an operation content prediction model.

FIG. 15 is a schematic diagram of the operation content prediction model M3. The operation content prediction model M3 is a learning model trained by supervised deep learning using an NN. The operation content prediction model M3 can be a model trained by a recurrent neural network. The operation content prediction model M3 is trained so as to output any one of the operation contents of making a change so as to increase the gear ratio or to decrease the gear ratio, or not to change (perform no operation) the gear ratio in the case where the input information related to traveling of the human-powered vehicle 1 acquired by the sensor 50 is input.

The operation content prediction model M3 has an input layer M31 to which input information is input, an output layer M32 from which an operation content of an operation predicted to be performed by the rider (OW/IW/absence) is output and an intermediate layer M33 composed of one or more layers each including a group of nodes. The intermediate layer M33 connected to the output layer M32 is a connection layer in which multiple nodes converge into the number of nodes in the output layer M32. The output layer M32 has three nodes. The nodes in the intermediate layer M33 each have a parameter including at least one of a weight and a bias in association with the node in the previous layer. By the function of the second electronic controller 116 as the training unit, the operation content prediction model M3 is trained by training data including input information such as a cadence, a torque, a travel speed, an acceleration, a tilt or the like that can be acquired from the sensor 50 and an operation content performed on the transmission device 31 by the rider a predetermined time after the input information is acquired as an output label (OW/IW/absence) while the human-powered vehicle 1 is traveling. The operation content prediction model M3 is trained by retro-propagation, to the intermediate layer M33, the error between the output that is output from the output layer M32 when input information out of the training data is input to the input layer M31 and the label associated with the input information in training data, and by updating the parameters of the nodes in the intermediate layer M33.

Not only input information such as a cadence, a torque, a vehicle speed, an acceleration, a tilt or the like that can be acquired from the sensor 50 is directly input to the input layer M31 at respective time points but also the changed amount in the last few seconds (e. g. two seconds) can be input to the operation content prediction model M3. The operation content prediction model M3 can be trained so as to output prediction of an operation content while affected by the input information previously input by the RNN.

Since the operation content prediction model M3 needs to be trained for each rider, it is stored in the storage unit 112 in a trained state to some extent prior to the delivery of the control device 100. The second electronic controller 116 trains as a training unit of the control device 100 the operation content prediction model M3 as described below after the human-powered vehicle 1 is shipped and purchased.

Figure 16:
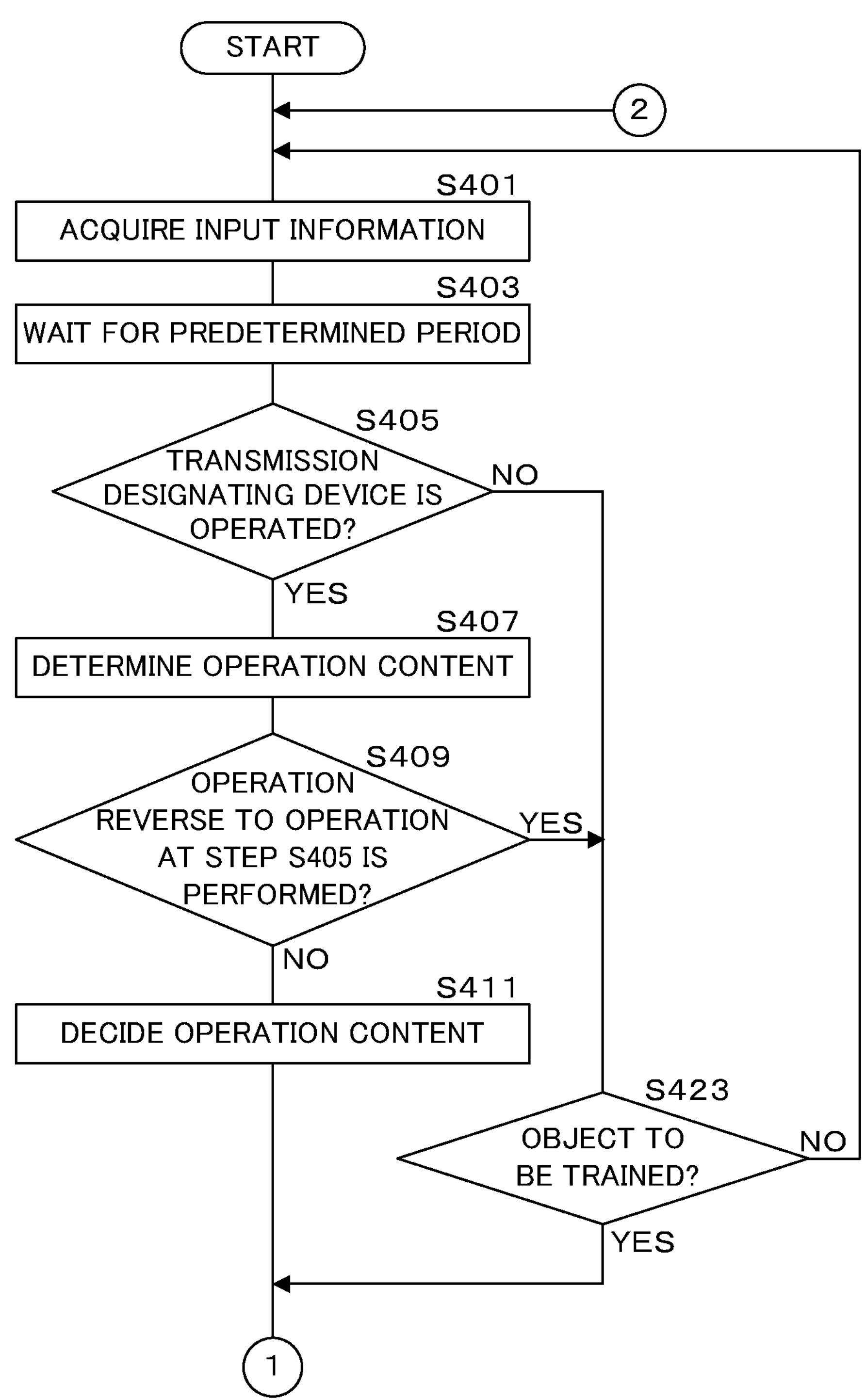
FIG. 16 is a flowchart illustrating one example of a processing procedure of training the operation content prediction model.
Figure 17:
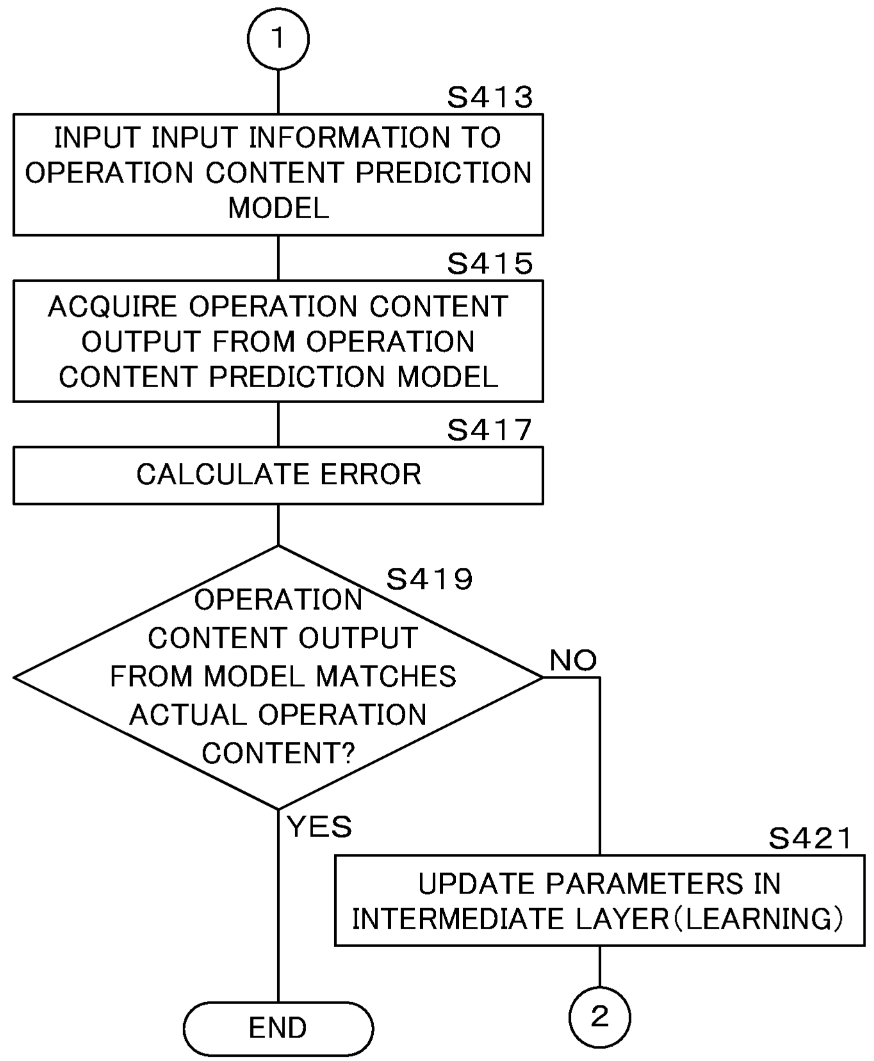
FIG. 17 is a flowchart illustrating one example of a processing procedure of training the operation content prediction model.

FIGS. 16 and 17 are flowcharts illustrating one example of a processing procedure of training the operation content prediction model M3. The second electronic controller 116 functions as the training unit for training the operation content prediction model M3 by executing the following processing based on the second control program P2 in a state that automatic control by the first electronic controller 114 is performed.

The second electronic controller 116 acquires input information from the sensor 50 (step S401), waits for a predetermined time (e. g. one to three seconds) (step S403) and determines whether or not the transmission designating member 33B is operated (step S405).

If it is determined that the transmission designating member 33B is operated (S405: YES), the second electronic controller 116 determines an operation content performed on the transmission designating member 33B (step S407). The second electronic controller 116 determines whether or not an operation reverse to the operation at step S407 is performed on the transmission designating member 33B immediately after (e. g. within 2 seconds) (step S409).

If it is determined the reverse operation is not performed (S409: NO), the second electronic controller 116 decides the operation content specified at step S407 (step S411).

The second electronic controller 116 inputs the input information acquired at step S401 to the input layer M31 of the under-training operation content prediction model M3 (step S413). The second electronic controller 116 acquires an operation content that is output from the output layer M32 of the operation content prediction model M3 in response to the processing at step S413 (step S415). The second electronic controller 116 calculates an error between the output from the operation content prediction model M3 acquired at step S415 and the operation content decided at step S407 by means of a predetermined error function (step S417).

The second electronic controller 116 determines whether or not the calculated error is equal to or less than a predetermined value and whether or not the operation content output from the operation content prediction model M3 matches the actual operation content performed by the rider decided at step S411 within a predetermined matching ratio (step S419). At step S419, the second electronic controller 116 can determine matching depending on whether or not the several most recent errors are consecutively equal to or less than a predetermined value. At step S419, the second electronic controller 116 can determine matching depending on whether or not the average of the errors falls within a predetermined value. Alternative to step S419, the second control 116 can end the learning depending on whether or not a predetermined number of learning have been reached.

If it is determined that they do not match (S419: NO), the second electronic controller 116 updates the parameters in the intermediate layer M33 by the calculated error (step S421) and returns the processing to step S401.

If it is determined that they match (S419: YES), the second electronic controller 116 ends the learning processing and starts processing by the second electronic controller 116 using the trained operation content prediction model M3.

If it is determined that the transmission designating member 33B is not operated (S405: NO), the second electronic controller 116 determines whether or not this is regarded as an object to be trained (step S423). If the transmission designating member 33B is not operated, the second electronic controller 116 executes the determination processing at step S423 in order to randomly set the absence of an operation as training data. In the case where a predetermined time has elapsed since the latest operation was performed on the transmission designating member 33B or since it was determined to be an object to be trained most recently at step S423, for example, the second electronic controller 116 determines this is regarded as an object to be trained. In the case where a predetermined number of input information have been obtained since the latest operation was performed on the transmission designating member 33B or since it was determined to be an object to be trained most recently at step S423, for example, the second electronic controller 116 determines this is regarded as an object to be trained with reference to the number pieces of data.

If it is determined that this is regarded as the object to be trained (S423: YES), the second electronic controller 116 advances the processing to step S413 to perform the learning with the label of absence of an operation (none) (S413 to S421).

If it is determined that this is not regarded as the object to be trained at step S423 (S423: NO), the second electronic controller 116 returns the processing to step S401 and performs the next learning processing.

The second electronic controller 116 advances the processing to step S423 if it is determined that a reverse operation is performed at step S409 (S409: YES). This is to avoid learning when an erroneous operation is performed.

This makes it possible to predict using the operation content prediction model M3 based on the input information corresponding to the travel state of the human-powered vehicle 1 an operation content (OW/IW/none) in the case where a manual operation is to be performed by the rider after several seconds. During a period when the human-powered vehicle 1 is brand new and has just been delivered, the first electronic controller 114 does not perform control to change the gear ratio unless the cadence reaches the first threshold while the rider can feel the need of changing it.

The operation content prediction model M3 outputs a prediction of the change to be made by the rider.

Figure 18:
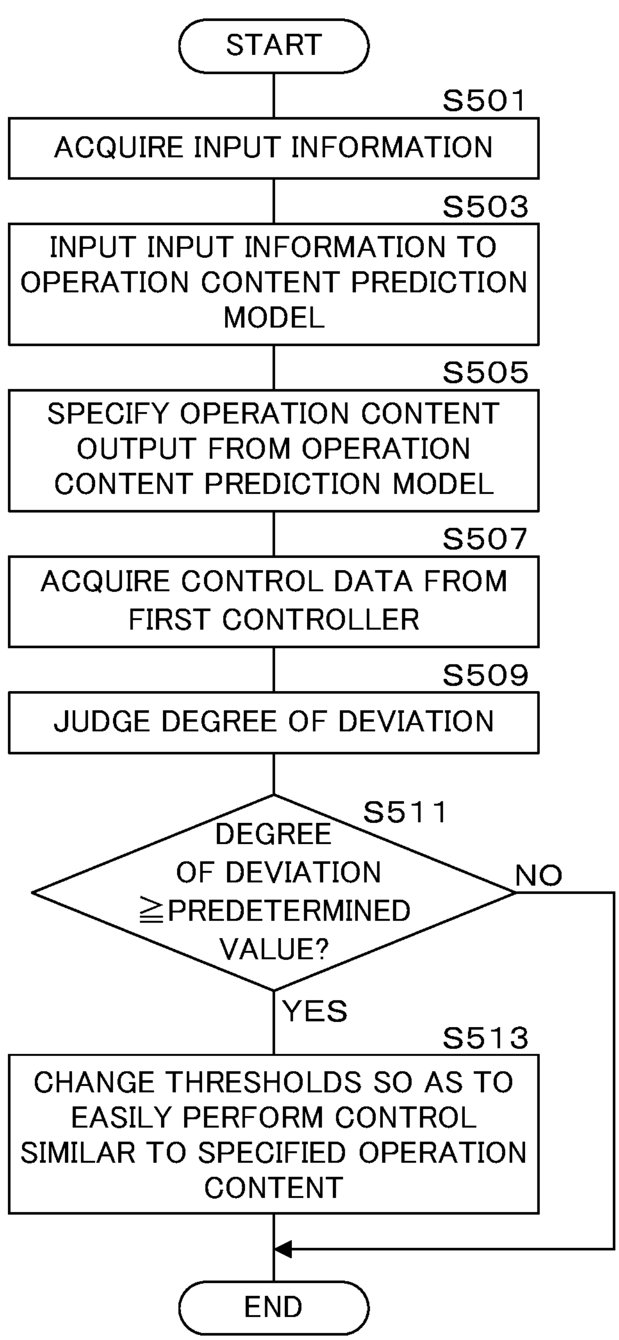
FIG. 18 is a flowchart illustrating one example of a processing procedure of changing a parameter performed by a second electronic controller according to the fourth embodiment.

FIG. 18 is a flowchart illustrating one example of a processing procedure of changing a control parameter performed by the second electronic controller 116 according to the fourth embodiment. The second electronic controller 116 executes the following processing after it is determined that training of the operation content prediction model M3 is finished by the processing procedure illustrated in FIGS. 16 and 17.

The second electronic controller 116 acquires input information from the sensor 50 (step S501) and inputs the acquired input information to the trained operation content prediction model M3 (step S503). The second electronic controller 116 specifies an operation content output from the operation content prediction model M3 (step S505).

The second electronic controller 116 acquires control data for the transmission device 31 from the first electronic controller 114 (step S507). At step S507, the second electronic controller 116 acquires details of the decision as to whether the first electronic controller 114 controls the transmission device 31 to increase the gear ratio or to decrease the gear ratio, or not to change the gear ratio. The second electronic controller 116 can also acquire as the control data the difference between the input information for deciding the gear ratio and the parameter deciding therefor.

The second electronic controller 116 determines the degree of deviation (deviation rate) between the operation content output from the operation content prediction model M3 and the control data acquired at step S507 (step S509). At step S509, the second electronic controller 116 determines as the magnitude of the deviation rate the difference between the value of the information as a reference for deciding the transmission ratio by the first electronic controller 114 out of the input information acquired at step S501 and the threshold used for deciding the operation content specified at step S505 by the first electronic controller 114. Specifically, at step S509, if change to OW is predicted at step S505, the second electronic controller 116 determines the difference between the cadence acquired at step S501 and the first threshold used for changing to OW as the deviation rate. If change to IW is predicted at step S505, the second electronic controller 116 determines the difference between the cadence acquired at step S501 and the second threshold used for changing to IW as the deviation rate. If no operation is predicted at step S505, the second electronic controller 116 determines the difference between cadence acquired at step S501 and the reference cadence as the deviation rate.

The second electronic controller 116 determines whether or not the deviation rate determined at step S509 is equal to or more than a predetermined value (step S511). If it is determined that the deviation rate is equal to or more than the predetermined value (S511: YES), the second electronic controller 116 changes the first threshold or the second threshold so as to easily perform control of the operation content similar to that specified at step S505 (step S513).

At step S513, if change to OW is predicted at step S505, the second electronic controller 116 lowers the first threshold from "90" to "85," for example. Likewise, if change to IW is predicted at step S505, the second electronic controller 116 increases the second threshold from "60" to "65," for example.

If it is determined that the deviation rate is less than the predetermined value at step S511 (S511: NO), the second electronic controller 116 ends the processing as it is since the operation content to be performed by the rider or absence of an operation performed matches the control type performed by the first electronic controller 114.

Thus, the operation content prediction model M3 predicts the rider's intention to drive the human-powered vehicle 1 depending on the situation of the rider and optimizes the automatic control by the first electronic controller 114 such that it is not deviated from the rider's intention.

Fifth Embodiment

Control by means of the operation content prediction model M3 illustrated in the fourth embodiment can also vary depending on each traveling condition. The configuration of the control device 100 in a fifth embodiment is similar to those in the fourth and first embodiments except for storing of multiple operation content prediction models M3 and the processing to be described below. The parts common to the first or fourth embodiment in the configuration of the control device 100 according to the fifth embodiment are denoted by the same reference codes and detailed description thereof will not be repeated.

Figure 19:
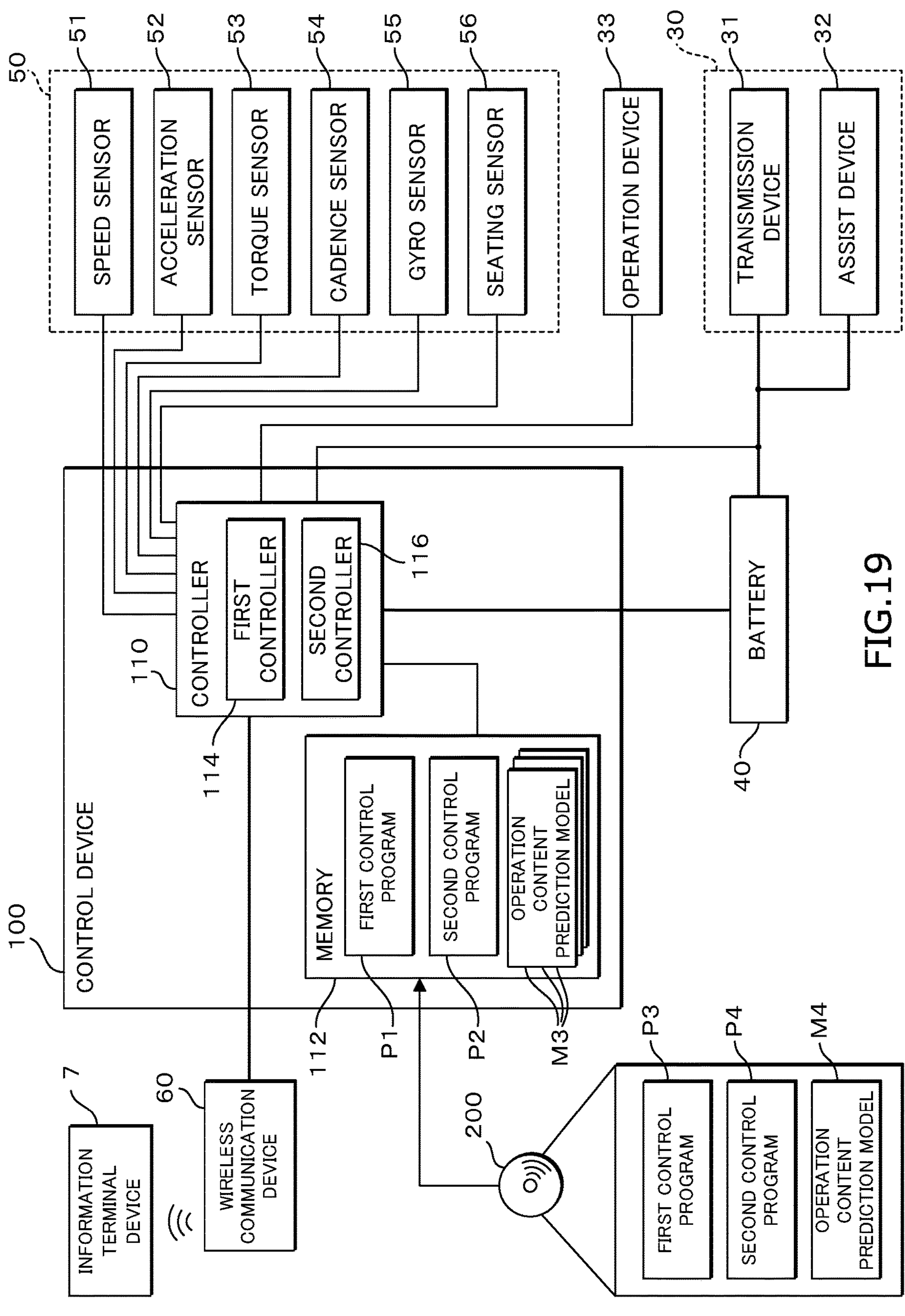
FIG. 19 is a block diagram illustrating the configuration of a control device according to a fifth embodiment.

FIG. 19 is a block diagram illustrating the configuration of the control device 100 according to the fifth embodiment. The control device 100 according to the fifth embodiment stores multiple operation content prediction models M3 in the storage unit 112. The operation content prediction models M3 are trained depending on the traveling conditions.

The control algorithm of the transmission device 31 by the first electronic controller 114 according to the fifth embodiment is similar to the control algorithm for each traveling condition according to the third embodiment (see FIG. 11). The first electronic controller 114 identifies a traveling condition as an off-road, a paved road or bad weather, for example, and decides a gear ratio for the transmission device 31 using a threshold according to the traveling condition.

Figure 20:
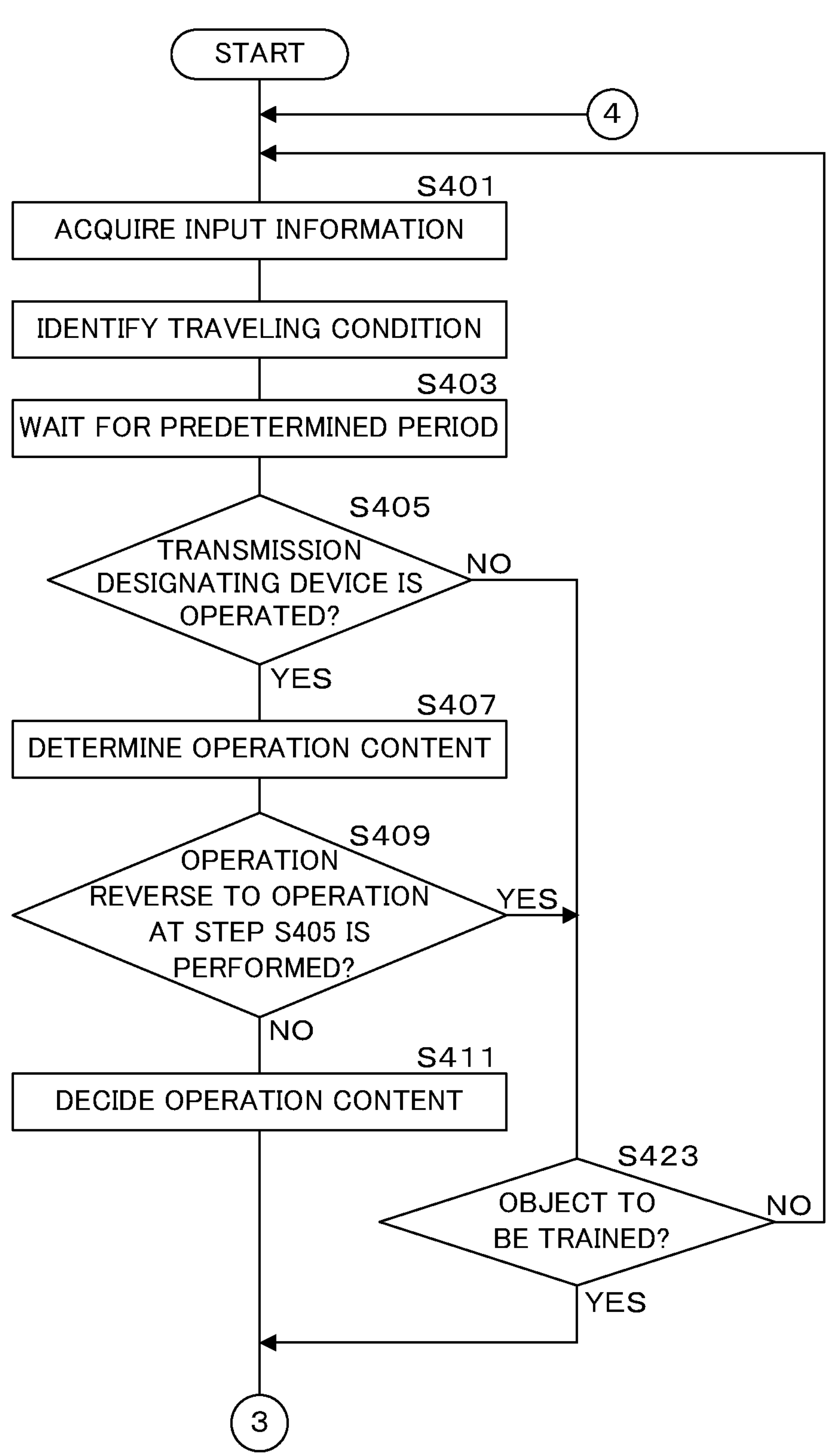
FIG. 20 is a flowchart illustrating one example of a processing procedure of training an operation content prediction model according to the fifth embodiment.
Figure 21:
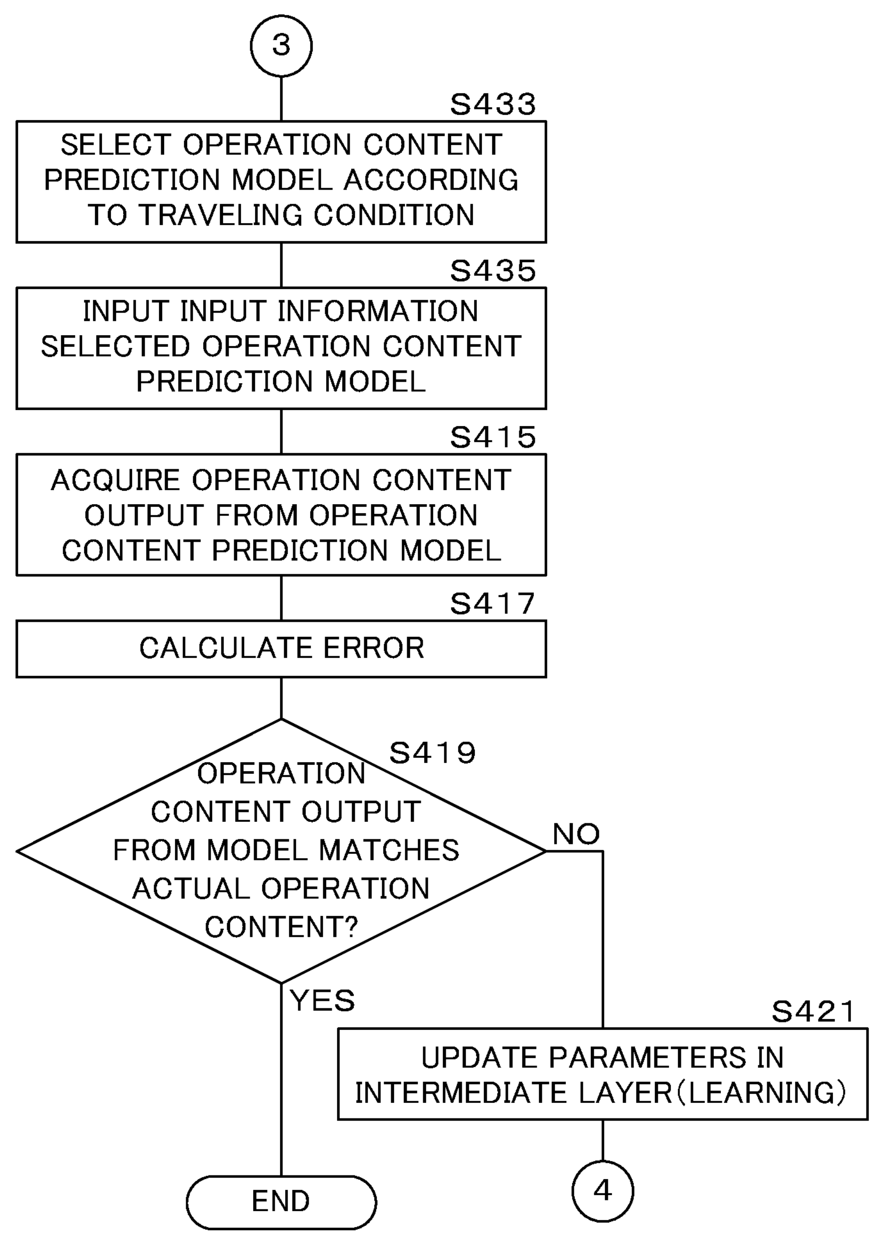
FIG. 21 is a flowchart illustrating one example of a processing procedure of training the operation content prediction model according to the fifth embodiment.

FIGS. 20 and 21 are flowcharts illustrating one example of a processing procedure of training the operation content prediction model M3 according to the fifth embodiment. The processing procedures of the flowcharts in FIGS. 20 and 21 common to those of the flowcharts in FIGS. 16 and 17 according to the fourth embodiment, respectively are denoted by the same step numbers and detailed description thereof will not be repeated.

The second electronic controller 116 acquires input information at step S401 (S401), and identifies a traveling condition based on the input information (step S431) while waiting for a predetermined time (S403). The traveling condition can be identified from a travel speed or a tilt of the vehicle main body that is acquired from the sensor 50 or can be identified in response to an operation performed by the rider on the mode selection button located on the operation members 33A of the operation device 33.

The second electronic controller 116 executes the processing from steps S405 to S411, and then selects one of the under-training operation content prediction models M3 according to the traveling condition (step S433). The second electronic controller 116 inputs the input information to the selected under-training operation content prediction model M3 (step S435) and then executes the processing at steps S415 to S421 on the selected under-training operation content prediction model M3.

Thus, the multiple operation content prediction models M3 are trained depending on the traveling conditions and become available.

Figure 22:
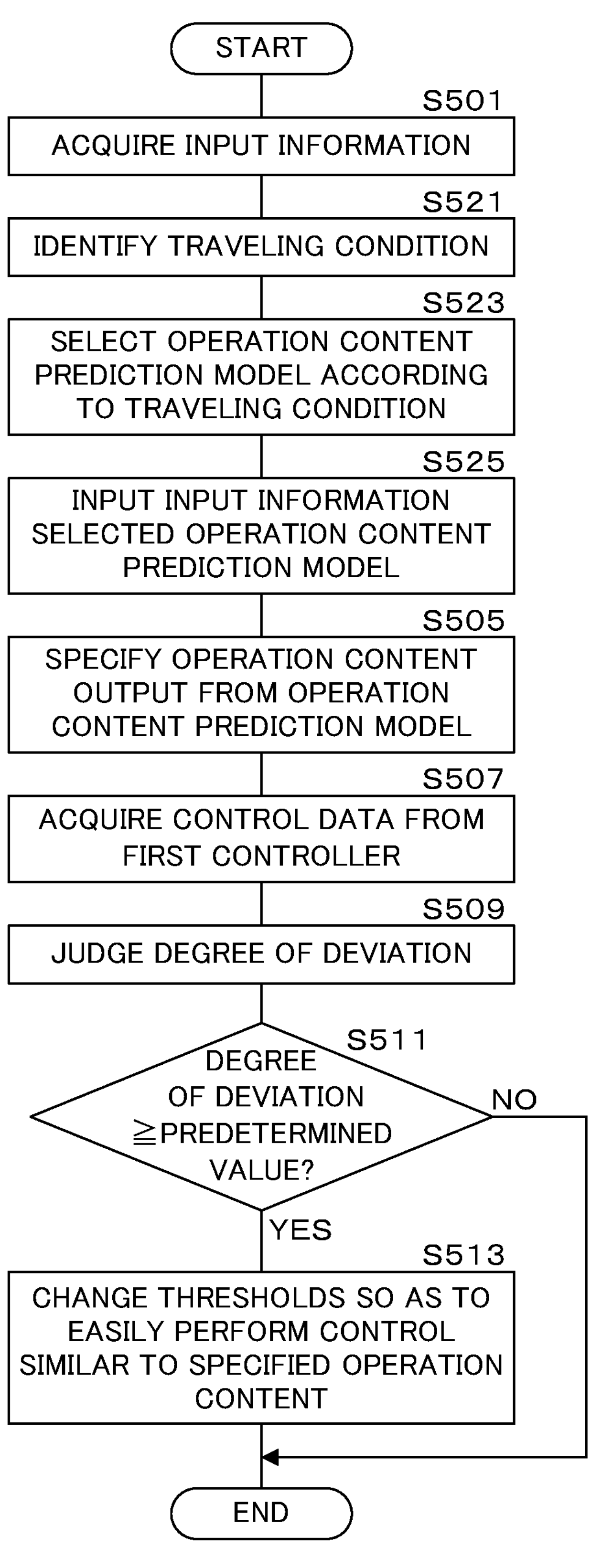
FIG. 22 is a flowchart illustrating one example of a processing procedure of changing a parameter performed by a second electronic controller according to the fifth embodiment.

FIG. 22 is a flowchart illustrating one example of a processing procedure of changing a parameter performed by the second electronic controller 116 according to the fifth embodiment. Among the processing procedure described in the flowchart in FIG. 22, procedures common to those described in the flowchart in FIG. 18 according to the fourth embodiment are denoted by the same step numbers and detailed description thereof will not be repeated.

The second electronic controller 116 according to the fifth embodiment acquires input information from the sensor 50 (S501) and identifies a traveling condition based on the input information (step S521). The second electronic controller 116 selects one of the trained operation content prediction models M3 according to the traveling condition (step S523). The second electronic controller 116 inputs the input information acquired at step S501 to the selected trained operation content prediction model M3 (step S525) and executes the processing at and after step S505.

In the fifth embodiment, even in the case where the electronic controller 110 performs precise automatic control depending on the thresholds (parameters) for the respective traveling conditions, the automatic control can be optimized to suit the specific habit and preference for each individual rider.

Sixth Embodiment

In the first to fifth embodiments, the electronic controller 110 automatically controls the device 30 (transmission device 31) in accordance with the control algorithm based on a comparison between the input information acquired from the sensor 50 by the first electronic controller 114 and the threshold. The control algorithm in a sixth embodiment is a control learning model M5 trained so as to output control data of the device 30 on the basis of the input information.

The configuration of the control device 100 according to the sixth embodiment is similar to that in the first embodiment except for storing of the control learning model M5 and the processing to be described below. The parts common to the first embodiment in the configuration of the control device 100 according to the sixth embodiment are denoted by the same reference codes and detailed description thereof will not be repeated.

Figure 23:
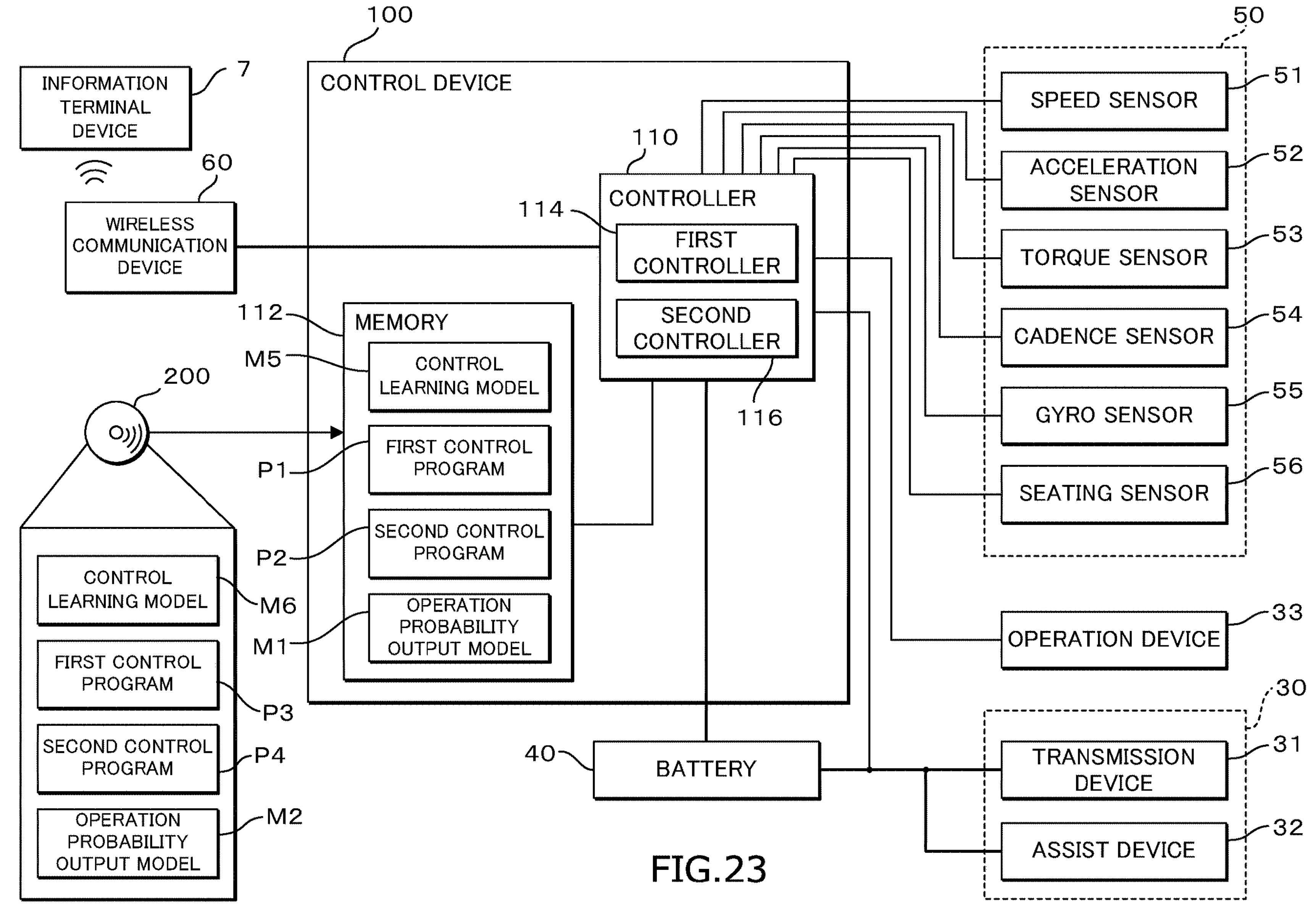
FIG. 23 is a block diagram illustrating the configuration of a control device according to a sixth embodiment.

FIG. 23 is a block diagram illustrating the configuration of the control device 100 according to the sixth embodiment. The control device 100 according to the sixth embodiment stores the control learning model M5 in the storage unit 112. The control learning model M5 can also be acquired by the electronic controller 110 reading out a trained control learning model M6 stored in the non-transitory recording medium 200 and copying it to the storage unit 112.

Figure 24:
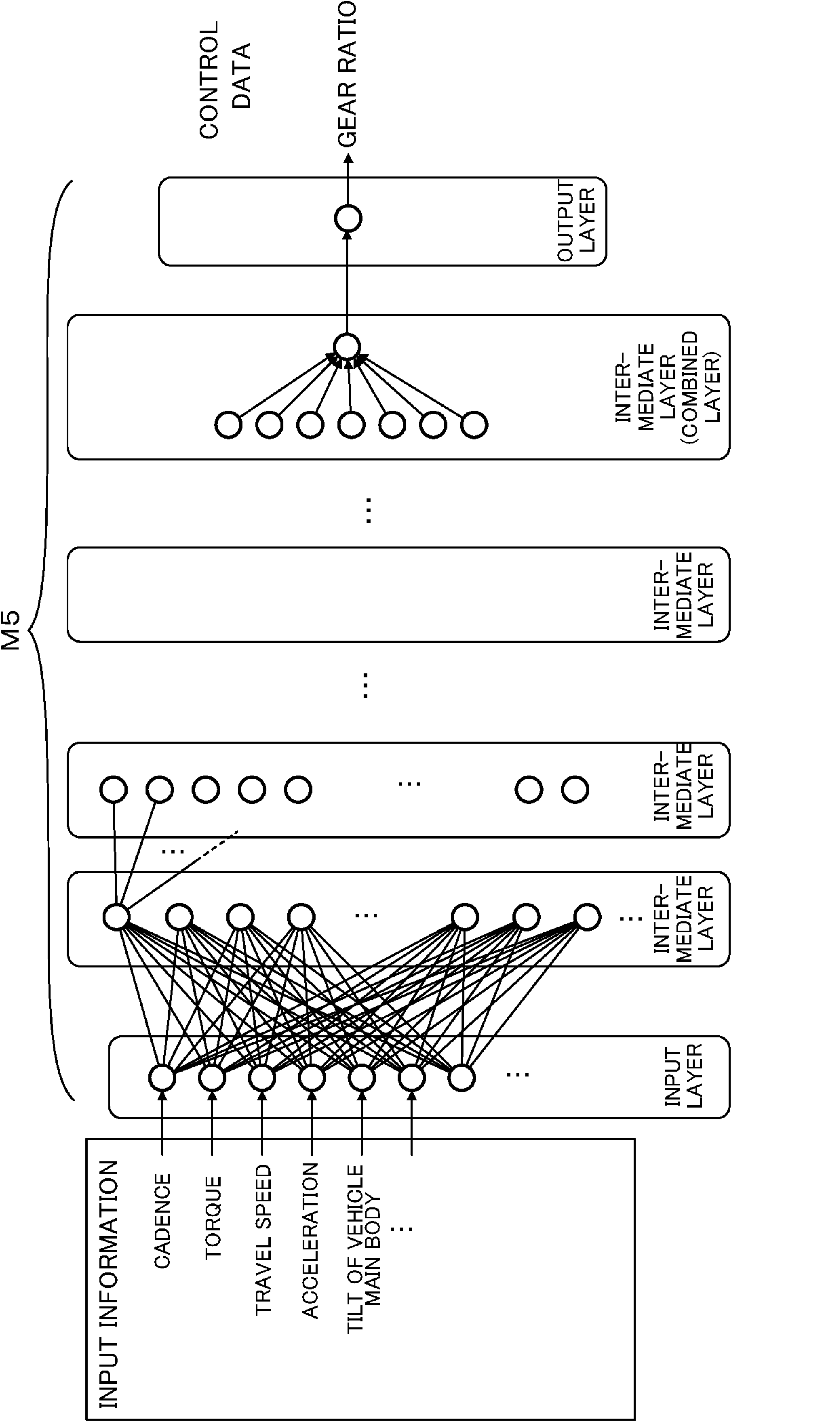
FIG. 24 is a schematic diagram of a control learning model.

FIG. 24 is a schematic diagram of the control learning model M5. The learning model 5M is a learning model trained by supervised deep learning using an NN. The learning model 5M can be trained by unsupervised deep learning, employing an output from the operation probability output model M1, i.e., the presence or absence of an intervening operation as an evaluation. The learning model 5M can be a model trained by using RNN in view of changes in the input information. As illustrated in FIG. 24, the learning model 5M is trained so as to output control data for deciding a control type of the device 30 after several seconds in the case where input information related to traveling of the human-powered vehicle 1 acquired from the sensor 50 is input. The input information includes at least one of a torque, a vehicle speed, an acceleration, a tilt and the presence or absence of a seated state without being limited to a cadence. If the device 30 is the transmission device 31, the control data to be output from the learning mode 5M is a gear ratio. If the device 30 is the assist device 32, the control data to be output from the learning model 5M is a value indicating the output from the assist device 32.

The first electronic controller 114 inputs the input information acquired in accordance with the first control program P1 of the sixth embodiment to the trained learning model 5M and controls the operation of the device 30, the power supply to the device 30 and the communication with the device 30 by control data output from the learning model 5M.

Figure 25:
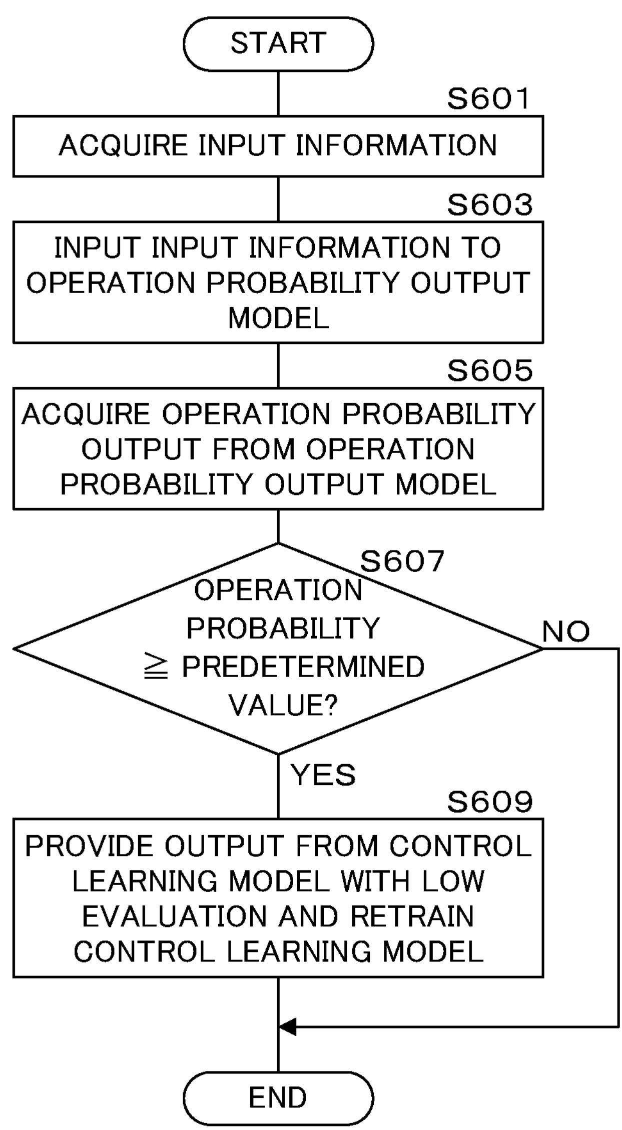
FIG. 25 is a flowchart illustrating one example of a processing procedure of changing a parameter performed by a second electronic controller according to the sixth embodiment.

The second electronic controller 116 according to the sixth embodiment employs the operation probability output model M1 illustrated in the first to third embodiments. FIG. 25 is a flowchart illustrating one example of a processing procedure of changing a control parameter performed by the second electronic controller 116 according to the sixth embodiment. The second electronic controller 116 executes the following processing by using the operation probability output model M1 having been trained.

The second electronic controller 116 acquires input information from the sensor 50 (step S601) and inputs the acquired input information to the trained operation probability output model M1 (step S603). The second electronic controller 116 acquires an operation probability that is output from the operation probability output model M1 (step S605). The second electronic controller 116 determines whether or not the operation probability that is obtained from the operation probability output model M1 is equal to or more than a predetermined value (step S607). If it is determined that the operation probability is equal to or more than the predetermined value (S607: YES), the second electronic controller 116 provides the output from the control learning model M5 with a low evaluation for retraining, and changes the parameter (step S609).

If it is determined that the operation probability is less than the predetermined value (S607: NO), the second electronic controller 116 ends the processing since the probability of the rider performing an intervening operation is low.

Hence, the control learning model M5 for which the control algorithm is trained based on the deep learning can also change the parameter similarly, and the automatic control by the first electronic controller 114 can be optimized so as to suit the rider's habit and preference.

In the sixth embodiment, the second electronic controller 116 changes the parameter (control learning model M5) for control by the first electronic controller 114 if the operation probability output from the operation probability output model M1 is equal to or more than the predetermined value. Alternatively, the second electronic controller 116 can employ the operation content prediction model M3. In the alternative example, the second electronic controller 116 changes the parameter for control (control learning model M5) by the first electronic controller 114 in the case where the deviation rate between the operation content output from the operation content prediction model M3 and the control data output from the control learning model M5 is equal to or more than a predetermined value.

For the automatic control performed by the first electronic controller 114 based on the control learning model M5 described in the sixth embodiment, the second electronic controller 116 can change the parameter using the operation probability output model M1 trained by discomfort level as described in the second embodiment. The second electronic controller 116 can employ multiple operation probability output models M1 as illustrated in the third embodiment or can employ the operation content prediction model M3 as illustrated in the fourth and fifth embodiments. In the case where the operation content prediction model M3 is employed, the second electronic controller 116 determines whether or not parameter for control is to be changed depending on whether or not the deviation rate is equal to or more than a predetermined value.

Seventh Embodiment

In the first to sixth embodiments, the electronic controller 110 is configured to perform automatic control on the transmission device 31 depending on the cadence at the crank 21 by the first electronic controller 114. The object to be automatically controlled by the first electronic controller 114, however, is not limited to the transmission device 31, and the reference to be referred for automatically controlling the transmission device 31 is not limited to the cadence.

The configuration of the control device 100 according to a seventh embodiment is similar to the control device 100 according to the first embodiment except for the control method by the first electronic controller 114 and an object to be changed by the second electronic controller 116. The parts common to the first embodiment in the configuration of the control device 100 according to the seventh embodiment are denoted by the same reference codes and detailed description thereof will not be repeated.

In the seventh embodiment, the electronic controller 110 automatically controls the transmission device 31 by the first electronic controller 114 depending on the magnitude of a torque at the crank 21 output from the torque sensor 53. The torque-based automatic control by the first electronic controller 114 described below can be replaced by the cadence-based control of the transmission device 31 according to the first to sixth embodiments.

Figure 26:
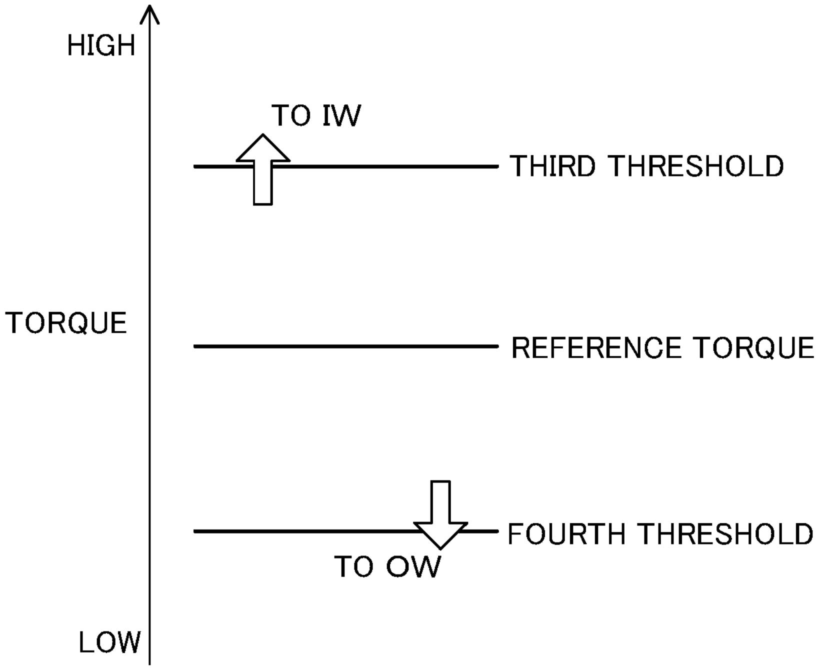
FIG. 26 is a schematic diagram of a control algorithm of a transmission device according to a seventh embodiment.

FIG. 26 is a schematic diagram of a control algorithm of the transmission device 31 according to the seventh embodiment. FIG. 26 represents the reference for change in the gear ratio for the torque acquired from the torque sensor 53. The torque is indicated to increase toward the upper part of FIG. 26. The first electronic controller 114 controls the torque applied to the crank 21 so as to fluctuate in the vicinity of the reference torque. The first electronic controller 114 executes a procedure of deciding a gear ratio by comparing the torque acquired from the torque sensor 53 with a predetermined threshold. If the torque acquired from the torque sensor 53 reaches a value equal to or more than a third threshold that is above the reference torque, the first electronic controller 114 decides the gear ratio lower than the current gear ratio. Conversely, if the torque reaches a value equal or to or less than a fourth threshold that is below the reference torque, the first electronic controller 114 decides the gear ratio higher than the current gear ratio.

Figure 27:
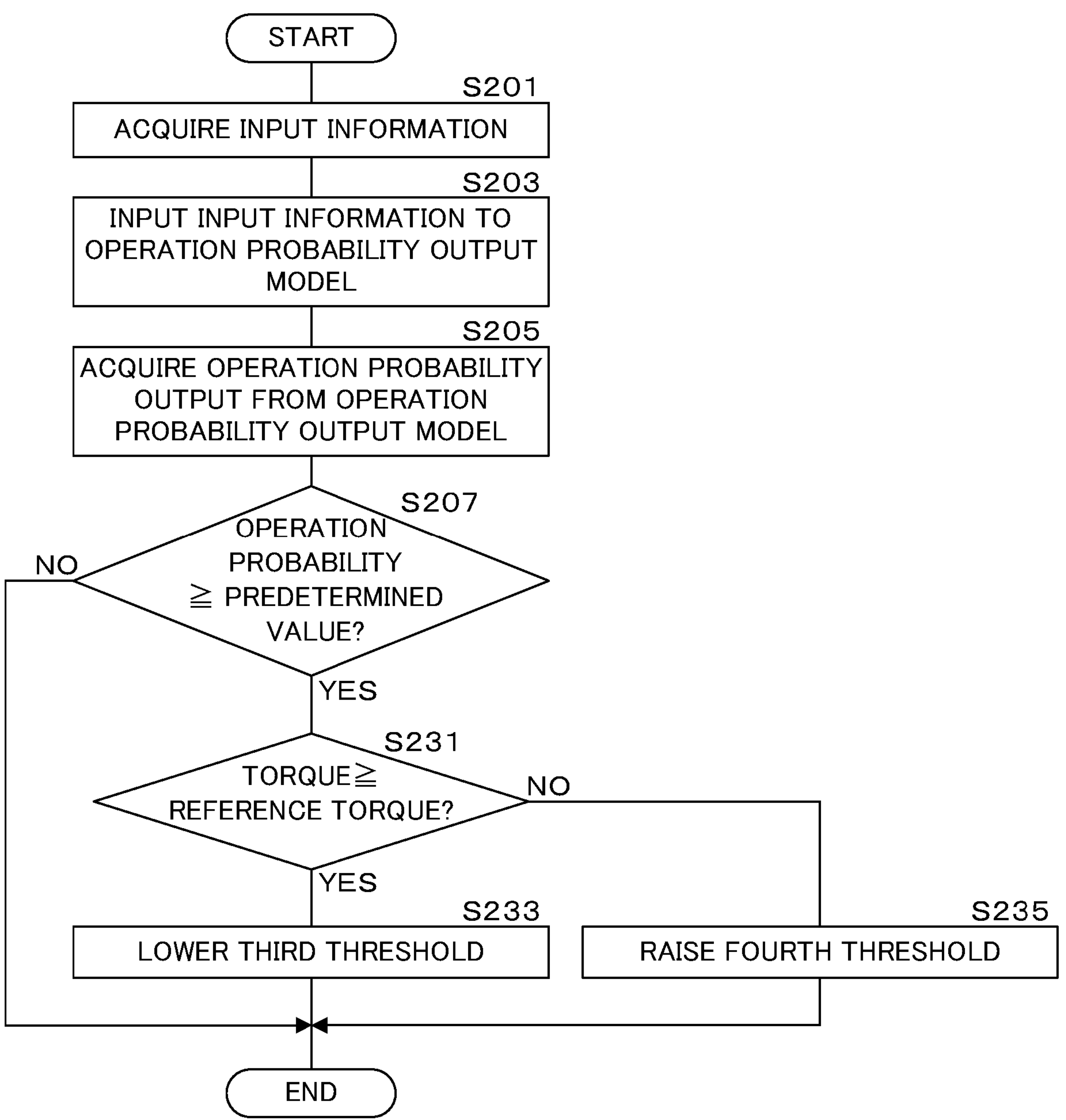
FIG. 27 is a flowchart illustrating one example of a processing procedure of changing a parameter performed by a second electronic controller according to the seventh embodiment.

In the seventh embodiment, the second electronic controller 116 changes as necessary at least one of the third and fourth thresholds that are used in the control algorithm illustrated in FIG. 26. FIG. 27 is a flowchart illustrating one example of a processing procedure of changing a control parameter performed by the second electronic controller 116 according to the seventh embodiment. The processing procedures of the flowchart in FIG. 27 common to those of the flowchart in FIG. 6 according to the first embodiment are denoted by the same step numbers and detailed description thereof will not be repeated.

The second electronic controller 116 determines whether or not the torque is equal to or more than the reference torque (step S231) if it is determined that the operation probability acquired from the operation probability output model M1 is equal to or more than the predetermined value (S207: YES). If it is determined that the torque is equal to or more than the reference torque (S231: YES), the second electronic controller 116 lowers the third threshold used for deciding the control data by the first electronic controller 114 (step S233) and ends the processing.

If it is determined that the torque is less than the reference torque at step S231 (S231: NO), the second electronic controller 116 raises the fourth threshold used for deciding the control data by the first electronic controller 114 (step S235) and ends the processing.

The second electronic controller 116 can perform determination depending on whether or not the torque is rising at step S231. The second electronic controller 116 can lower the third threshold if it is determined the torque is rising and can raise the fourth threshold if it is determined that the torque is falling. In place of changing the parameter (threshold) at step S233 or S235, the second electronic controller 116 can adjust the timing of changing the gear ratio to be earlier.

The torque-based control performed by the first electronic controller 114 illustrated in the seventh embodiment can be executed by the reference values depending on the traveling conditions as described in the third and fifth embodiments. Though processing using the operation probability output model M1 is described in the seventh embodiment, processing using the operation content prediction model M3 according to the fourth embodiment can also be applied.

Eighth Embodiment

In the eighth embodiment, the electronic controller 110 automatically controls the transmission device 31 by the first electronic controller 114 depending on the travel speed of the human-powered vehicle 1. The travel speed-based automatic control of the transmission device 31 performed by the first electronic controller 114 according to the eighth embodiment to be described below can be replaced by the cadence based-control of the transmission device 31 according to the first to sixths embodiments.

The configuration of the control device 100 according to the eighth embodiment is similar to that of the control device 100 of the first embodiment except for a control method by the first electronic controller 114 and an object to be changed by the second electronic controller 116. The parts common to the first embodiment in the configuration of the control device 100 according to the eighth embodiment are denoted by the same reference codes and detailed description thereof will not be repeated.

Figure 28:
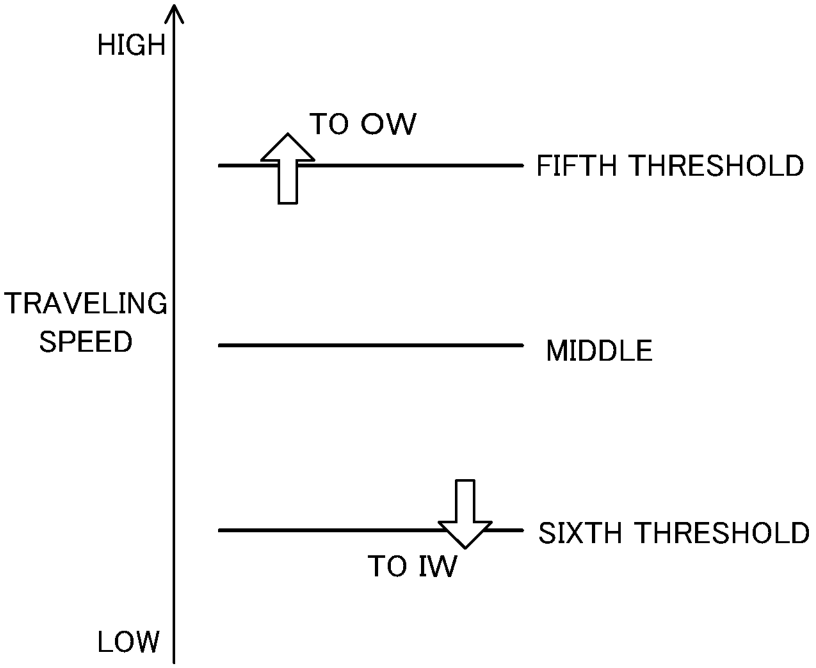
FIG. 28 is a schematic diagram of a control algorithm of a transmission device according to an eighth embodiment.

FIG. 28 is a schematic diagram of a control algorithm of the transmission device 31 according to the eighth embodiment. FIG. 28 represents the reference for the change in the gear ratio for the speed acquired from the speed sensor 51. FIG. 28 indicates higher speed toward the upper part and lower speed toward the lower part. The first electronic controller 114 executes a procedure of deciding a gear ratio by comparing the travel speed of the human-powered vehicle 1 acquired from the speed sensor 51 with a predetermined threshold. In the case where the travel speed acquired from the speed sensor 51 reaches a value equal to or higher than a fifth threshold, the first electronic controller 114 decides to increase the gear ratio. Conversely, in the case where the travel speed reaches a value equal to or lower than a sixth threshold, the first electronic controller 114 decides to decrease the gear ratio. The first electronic controller 114 can perform control to further increase or decrease the gear ratio by comparing thresholds other than the fifth and sixth thresholds with the travel speed.

Figure 29:
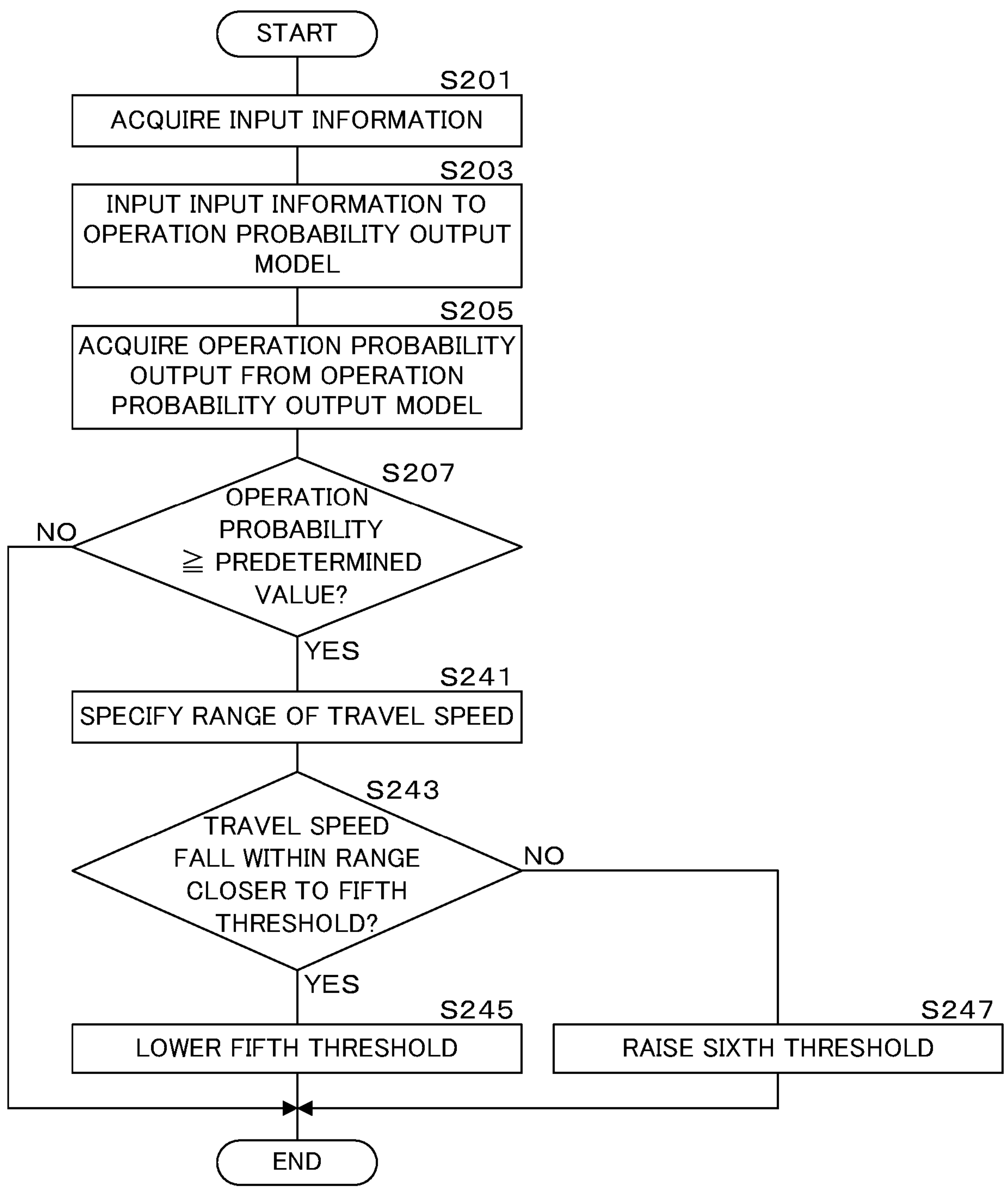
FIG. 29 is a flowchart illustrating one example of a processing procedure of changing a control parameter performed by a second electronic controller according to the eighth embodiment.

In the eighth embodiment, the second electronic controller 116 changes at least one of the fifth and sixth thresholds as necessary using the control algorithm illustrated in FIG. 28. FIG. 29 is a flowchart illustrating one example of a processing procedure of changing a control parameter performed by the second electronic controller 116 according to the eighth embodiment. The processing procedures of the flowchart in FIG. 29 common to those of the flowchart in FIG. 6 according to the first embodiment are denoted by the same step numbers and detailed description thereof will not be repeated.

If it is determined that the operation probability obtained from the operation probability output model M1 is equal to or more than a predetermined value (S207: YES), the second electronic controller 116 specifies a part of range of the travel speed, divided by the fifth and sixth thresholds, the travel speed falls (step S241). At step S241, the second electronic controller 116 specifies whether or not the travel speed falls within the part of the range more toward the fifth threshold or the sixth threshold. At step S241, the second control 116 can specify whether the travel speed is rising or falling.

The second electronic controller 116 determines whether or not the travel speed falls within the part of the range more toward the fifth threshold at step S241 (step S243). If it is determined that the travel speed falls within the part of the range more toward the fifth threshold (S243: YES), the second electronic controller 116 lowers the fifth threshold used for deciding the control data by the first electronic controller 114 (step S245) and ends the processing.

If it is determined that the travel speed falls within the part of the range more toward the sixth threshold at step S243 (S243: NO), the second electronic controller 116 raises the sixth threshold used for deciding control data by the first electronic controller 114 (step S237) and ends the processing.

The travel speed-based control performed by the first electronic controller 114 described in the eighth embodiment can be executed by the reference values depending on the traveling conditions as described in the third and fifth embodiments. Though processing using the operation probability output model M1 is described in the eighth embodiment, processing using the operation content prediction model M3 according to the fourth embodiment can also be applied.

Ninth Embodiment

In a ninth embodiment, the electronic controller 110 automatically controls the assist device 32 by the first electronic controller 114 depending on the cadence. The cadence-based automatic control of the assist device 32 performed by the first electronic controller 114 according to the ninth embodiment to be described below can be replaced by the cadence-based control of the transmission device 31 according to the first to sixths embodiments.

The configuration of the control device 100 according to the ninth embodiment is the same as that of the control device 100 of the first embodiment except for an object to be controlled and a control method by the first electronic controller 114 and an object to be changed by the second electronic controller 116. Accordingly, the parts common to the first embodiment in the configuration of the control device 100 according to the ninth embodiment are denoted by the same reference codes and detailed description thereof will not be repeated.

Figure 30:
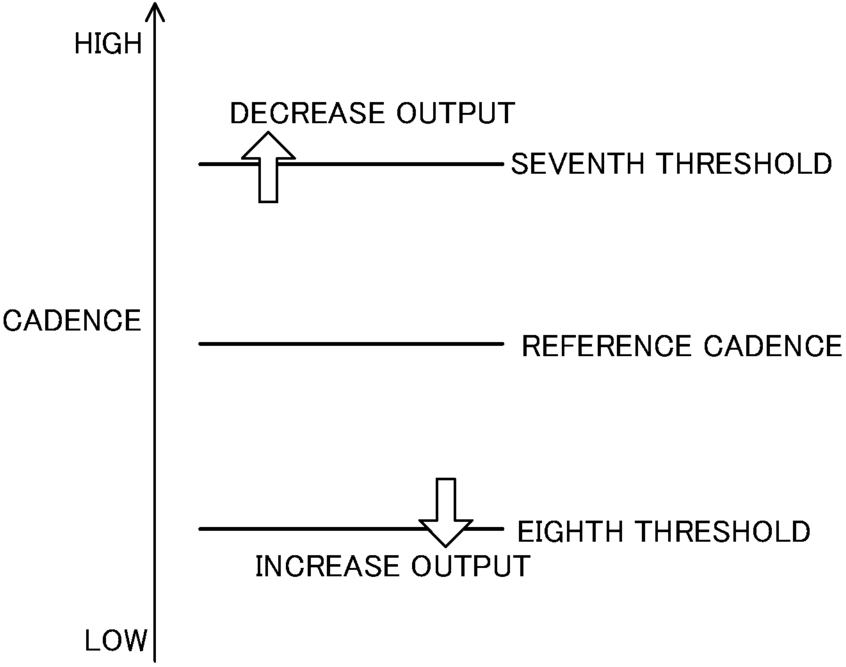
FIG. 30 is a schematic diagram of a control algorithm of an assist device according to a ninth embodiment.

FIG. 30 is a schematic diagram of a control algorithm of the assist device 32 according to the ninth embodiment. FIG. 30 represents the reference for the change in output of the assist device 32 for the cadence obtained from the cadence sensor 54. FIG. 30 indicates higher cadence toward the upper part thereof. The first electronic controller 114 controls the cadence of the crank 21 so as to fluctuate in the vicinity of the reference cadence. The first electronic controller 114 executes a procedure of deciding the output from the assist device 32 by comparing the cadence acquired by the cadence sensor 54 with a predetermined threshold. In the case where the cadence acquired from the cadence sensor 54 reaches a value equal to or higher than a seventh threshold, the first electronic controller 114 decides to make the output from the assist device 32 smaller, that is, decides to decrease the output therefrom. Conversely, in the case where the cadence reaches a value equal to or lower than an eighth threshold, the first electronic controller 114 decides to make the output from the assist device 32 larger, that is, decides to increase the output therefrom.

Figure 31:
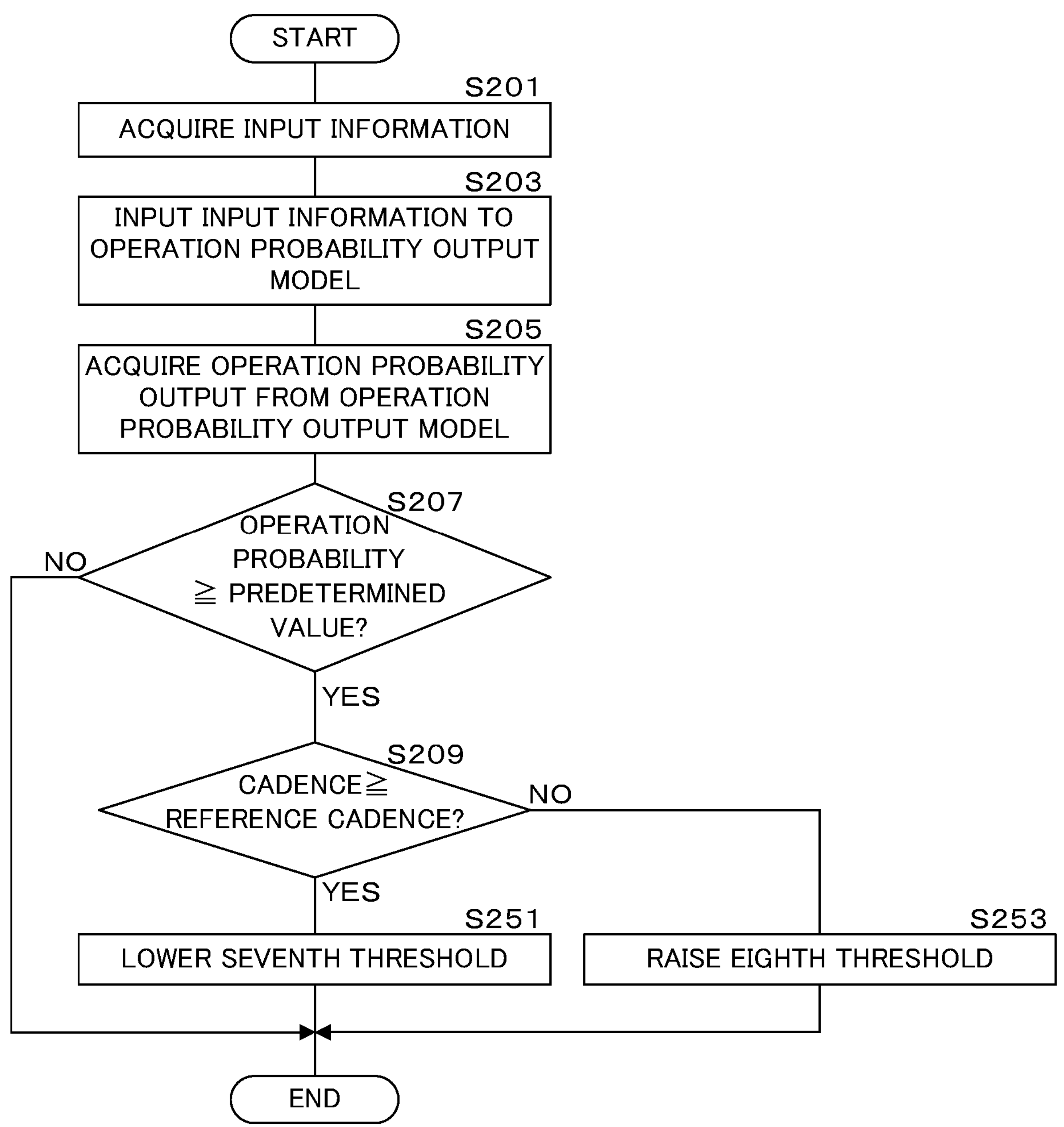
FIG. 31 is a flowchart illustrating one example of a processing procedure of changing a control parameter performed by a second electronic controller according to the ninth embodiment.

In the ninth embodiment, the second electronic controller 116 changes as necessary at least one of the seventh and eighth thresholds used in the control algorithm illustrated in FIG. 30. FIG. 31 is a flowchart illustrating one example of a processing procedure of changing a control parameter performed by the second electronic controller 116 according to the ninth embodiment. The processing procedures of the flowchart in FIG. 31 common to those of the flowchart in FIG. 6 according to the first embodiment are denoted by the same step numbers and detailed description thereof will not be repeated.

The second electronic controller 116 determines whether or not the cadence is equal to or more than the reference cadence (S209) if it is determined that the operation probability output from the operation probability output model M1 is equal to or more than a predetermined value (S207: YES). If it is determined that the cadence is equal to or more than the reference cadence (S209: YES), the second electronic controller 116 lowers the seventh threshold used for deciding the output from the assist device 32 by the first electronic controller 114 (step S251) and ends the processing.

If it is determined that the cadence is lower than the reference cadence (S209: NO), the second electronic controller 116 raises the eighth threshold used for deciding the control data by the first electronic controller 114 (step S253) and ends the processing.

The cadence-based control performed by the first electronic controller 114 described in the ninth embodiment can be executed by the reference values depending on the traveling conditions as described in the third and fifth embodiments. Though processing using the operation probability output model M1 is described in the ninth embodiment, processing using the operation content prediction model M3 according to the fourth embodiment can also be applied.

Tenth Embodiment

In the tenth embodiment, the electronic controller 110 automatically controls the assist device 32 by the first electronic controller 114 depending on the magnitude of the torque at the crank 21. The torque-based automatic control of the assist device 32 performed by the first electronic controller 114 according to the tenth embodiment to be described below can be replaced by the cadence-based control of the transmission device 32 according to the first to sixths embodiments.

The configuration of the control device 100 according to the tenth embodiment is the same as that of the control device 100 of the first embodiment except for an object to be controlled and a control method by the first electronic controller 114 and an object to be changed by the second electronic controller 116. The parts common to the first embodiment in the configuration of the control device 100 according to the tenth embodiment are denoted by the same reference codes and detailed description thereof will not be repeated.

Figure 32:
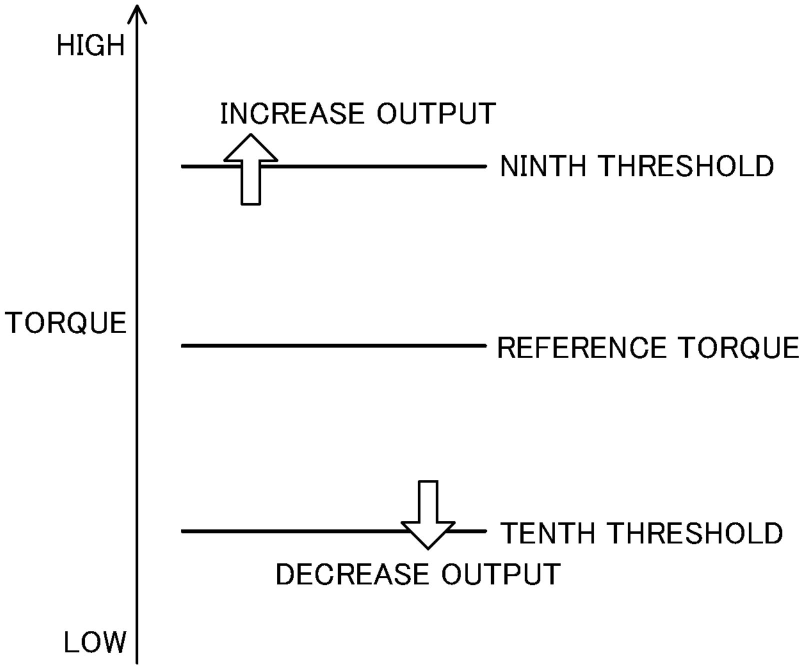
FIG. 32 is a schematic diagram of a control algorithm of an assist device according to a tenth embodiment.

FIG. 32 is a schematic diagram of a control algorithm of the assist device 32 according to the tenth embodiment. FIG. 32 represents the reference for the change in the output of the assist device 32 for the torque acquired from the torque sensor 53. FIG. 32 indicates higher torqued toward the upper part thereof. The first electronic controller 114 controls the torque at the crank 21 so as to fluctuate in the vicinity of the reference torque. The first electronic controller 114 executes a procedure of deciding an output from the assist device 32 by comparing the torque acquired from the torque sensor 53 with a predetermined threshold. In the case where the torque acquired from the torque sensor 53 reaches a value equal to or more than a ninth threshold, the first electronic controller 114 decides to make the output from the assist device 32 larger, that is, decides to increase the output therefrom. Conversely, in the case where the cadence reaches a value equal to or lower than a tenth threshold, the first electronic controller 114 decides to make the output from the assist device 32 smaller, that is, decides to decrease the output therefrom.

Figure 33:
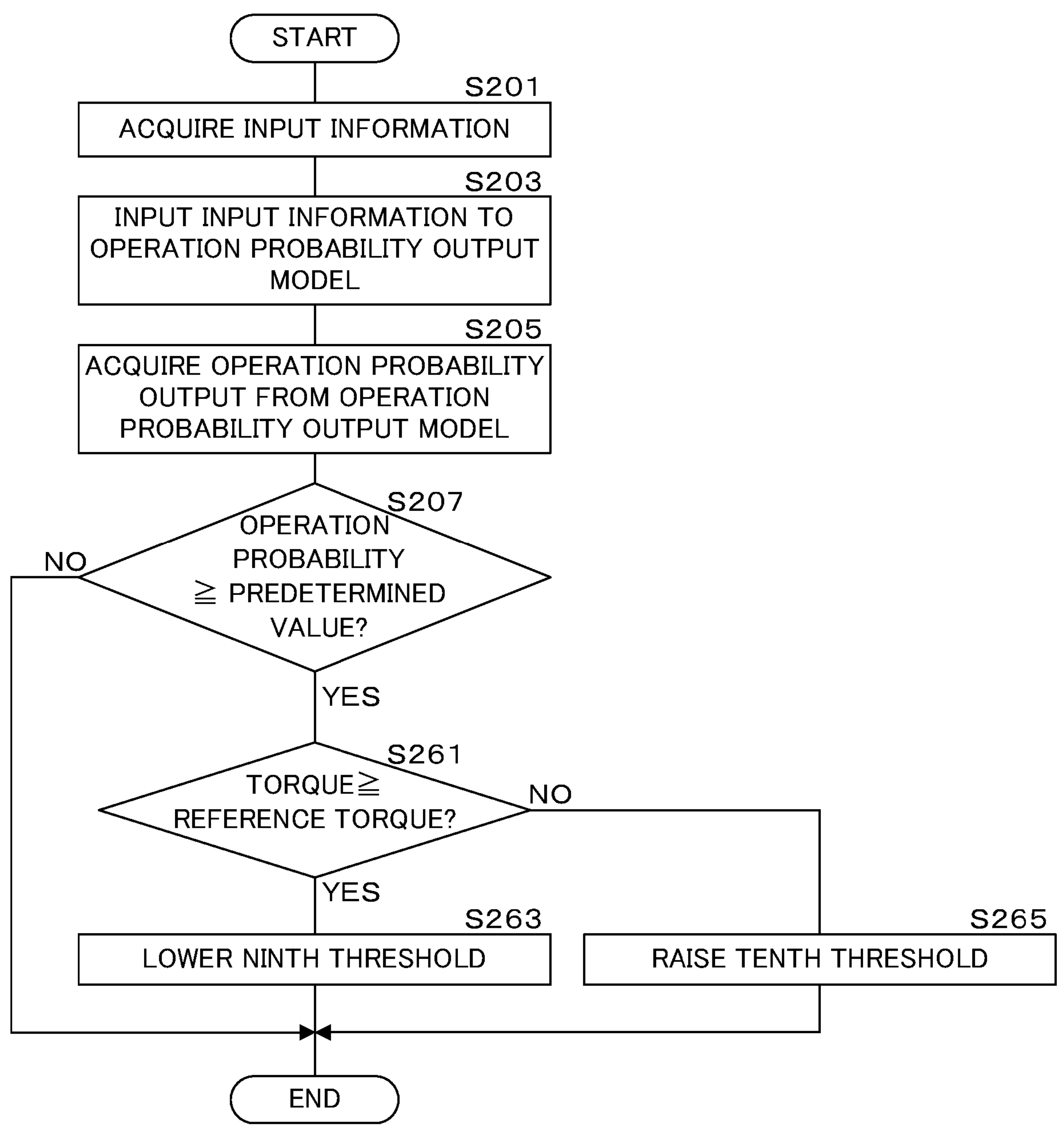
FIG. 33 is a flowchart illustrating one example of a processing procedure of changing a control parameter performed by a second electronic controller according to the tenth embodiment.

In the tenth embodiment, the second electronic controller 116 changes as necessary at least one of the ninth and tenth thresholds used in the control algorithm illustrated in FIG. 32. FIG. 33 is a flowchart illustrating one example of a processing procedure of changing a control parameter performed by the second electronic controller 116 according to the tenth embodiment. The processing procedures of the flowchart in FIG. 33 common to those of the flowchart in FIG. 6 according to the first embodiment are denoted by the same step numbers and detailed description thereof will not be repeated.

The second electronic controller 116 determines whether or not the torque is equal to or higher than the reference torque (step S261) if it is determined that the operation probability output from the operation probability output model M1 is equal to or more than a predetermined value (S207:YES). If it is determined that the torque is equal to or higher than the reference torque (S261: YES), the second electronic controller 116 lowers the ninth threshold used for deciding the control data by the first electronic controller 114 (step S263) and ends the processing.

If it is determined that the torque is lower than the reference torque (S261: NO), the second electronic controller 116 raises the tenth threshold used for deciding the control data by the first electronic controller 114 (step S265) and ends the processing.

At step S261, the second electronic controller 116 can perform determination depending on whether or not the torque is rising. The second electronic controller 116 can lower the ninth threshold if it is determined that the torque is rising, and can increase the tenth threshold if it is determined that the torque is falling. In place of changing the parameter (threshold) at step S263 or S265, the second electronic controller 116 can adjust the timing of changing the output from the assist device 32 to be earlier.

The torque-based control performed by the first electronic controller 114 described in the tenth embodiment can be executed by the reference values depending on the traveling conditions as described in the third and fifth embodiments. Though processing using the operation probability output model M1 is described in the tenth embodiment, processing using the operation content prediction model M3 according to the fourth embodiment can also be applied.

It is to be understood that the embodiments disclosed here are illustrative in all respects and not restrictive. The scope of the present invention is defined by the appended claims, not by the above-mentioned meaning, and all changes that fall within the meanings and the bounds of the claims, or equivalence of such meanings and bounds are intended to be embraced by the claims.

What is claimed is:

1. A human-powered vehicle control device comprising:

at least one sensor configured to acquire input information related to traveling of a human-powered vehicle;

a first electronic controller configured to decide control data of a device provided at the human-powered vehicle in accordance with a predetermined control algorithm based on the input information acquired and performs automatic control on the device by the control data decided;

a non-transitory computer readable storage having an operation probability output model that outputs a probability of a rider performing an intervening operation during the traveling of the human-powered vehicle prior to automatic control of the device based on the input information; and a second electronic controller configured to change a parameter for deciding the control data in a case where the operation probability output model outputs a probability of the rider performing an intervening operation to be equal to or more than a predetermined value.

2. The human-powered vehicle control device according to claim 1, wherein the second electronic controller is configured to train the operation probability output model, set the input information as an input, and set, as an output label, a presence or an absence of an intervening operation performed on the device by the rider a predetermined time after the input information is acquired.

3. The human-powered vehicle control device according to claim 2, wherein the second electronic controller is configured to execute processing in a case where an error between a probability obtained by inputting the input information to the operation probability output model and a result as to whether or not the rider has performed the intervening operation after a predetermined time falls in a predetermined matching ratio.

4. The human-powered vehicle control device according to claim 1, wherein the second electronic controller is configured to train the operation probability output model, set the input information as an input, and set, as an output label, a value corresponding to a rider's discomfort level a predetermined time after the input information is acquired.

5. The human-powered vehicle control device according to claim 4, wherein the rider's discomfort level is derived based on at least one of a magnitude of a cadence of the human-powered vehicle, a magnitude of a torque of the human-powered vehicle, a seated state of the rider, and biological information of the rider.

6. The human-powered vehicle control device according to claim 1, wherein the first electronic controller is configured to use the predetermined control algorithm to decide the control data of the device based on the input information using a different parameter depending on a traveling condition of the human-powered vehicle, and the second electronic controller is configured to train the operation probability output model depending on the traveling condition.

7. The human-powered vehicle control device according to claim 1, wherein the predetermined control algorithm includes a procedure of comparing a sensor value included in the input information with a predetermined threshold and deciding the control data, and the second electronic controller is configured to execute at least one of changing a value of the threshold and changing a control timing performed by the first electronic controller.

8. The human-powered vehicle control device according to claim 1, wherein the predetermined control algorithm is a learning model trained so as to output the control data of the device based on the input information, and the second electronic controller is configured to change a parameter of the learning model.

9. The human-powered vehicle control device according to claim 1, wherein the device is a transmission device of the human-powered vehicle, and the input information includes a cadence of a crank in a driving mechanism of the human-powered vehicle, the first electronic controller is configured to control the transmission device so as to increase a gear ratio in a case where an acquired cadence is equal to or more than a predetermined first threshold, and control the transmission device so as to decrease the gear ratio in a case where the acquired cadence is equal to or lower than a second threshold that is below the first threshold, and the second electronic controller is configured to change at least one of the first threshold and the second threshold.

10. The human-powered vehicle control device according to claim 9, wherein the second electronic controller is configured to execute at least one of lowering the first threshold and raising the second threshold.

11. The human-powered vehicle control device according to claim 1, wherein the device is a transmission device of the human-powered vehicle, and the input information includes a torque of a crank in a driving mechanism of the human-powered vehicle, the first electronic controller is configured to control the transmission device so as to decrease the gear ratio in a case where an acquired torque is equal to or more than a predetermined third threshold, and control the transmission device so as to increase the gear ratio in a case where the acquired torque is equal to or less than a fourth threshold that is below the third threshold, and the second electronic controller is configured to change at least one of the third threshold and the fourth threshold.

12. The human-powered vehicle control device according to claim 11, wherein the second electronic controller is configured to execute at least one of lowering the third threshold and raising the fourth threshold.

13. The human-powered vehicle control device according to claim 1, wherein the device is a transmission device of the human-powered vehicle, and the input information includes a travel speed of the human-powered vehicle, the first electronic controller is configured to control the transmission device so as to increase a gear ratio in a case where an acquired travel speed is equal to or more than a predetermined fifth threshold and controls the transmission device so as to decrease the gear ratio in a case where the acquired travel speed is equal to or lower than a sixth threshold that is below the fifth threshold, and the second electronic controller is configured to change at least one of the fifth threshold and the sixth threshold.

14. The human-powered vehicle control device according to claim 13, wherein the second electronic controller is configured to execute at least one of lowering the fifth threshold and raising the sixth threshold.

15. A human-powered vehicle control method comprising:

acquiring input information related to traveling of a human-powered vehicle with at least one sensor, using a first electronic controller to decide control data of a device provided at the human-powered vehicle in accordance with a predetermined control algorithm based on the input information acquired and performing automatic control on the device by the control data decided using an operation probability output model stored on a non-transitory computer readable medium that outputs based on the input information acquired a probability of a rider performing an intervening operation during the traveling of the human-powered vehicle prior to automatic control on a device provided at the human-powered vehicle in accordance with the predetermined control algorithm based on the input information, using a second electronic controller to change a parameter for deciding the control data in a case where the operation probability output model is equal to or more than a predetermined value, and performing automatic control with a changed parameter by the electronic controller.

16. A computer program disposed upon a non-transitory computer readable storage medium and executable by a computer, the computer program causing the computer to execute processing of:

acquiring input information related to traveling of a human-powered vehicle;

using an operation probability output model that outputs based on the input information acquired a probability of a rider performing an intervening operation during the traveling of the human-powered vehicle prior to an electronic controller performing automatic control on a device provided at the human-powered vehicle in accordance with a predetermined control algorithm based on the input information, and changing a parameter for the automatic control in a case the operation probability output model outputs a probability of the rider performing an intervening operation equal to or more than a predetermined value.

* * * * *